US010984054B2

(12) United States Patent
Alsallakh et al.

(10) Patent No.: US 10,984,054 B2
(45) Date of Patent: Apr. 20, 2021

(54) VISUAL ANALYTICS SYSTEM FOR CONVOLUTIONAL NEURAL NETWORK BASED CLASSIFIERS

(71) Applicant: Robert Bosch GmbH, Stuttgart (DE)

(72) Inventors: Bilal Alsallakh, Mountain View, CA (US); Amin Jourabloo, East Lansing, MI (US); Mao Ye, San Jose, CA (US); Xiaoming Liu, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 16/042,491

(22) Filed: Jul. 23, 2018

(65) Prior Publication Data

US 2019/0034557 A1 Jan. 31, 2019

Related U.S. Application Data

(60) Provisional application No. 62/537,613, filed on Jul. 27, 2017.

(51) Int. Cl.
*G06F 16/904* (2019.01)
*G06F 16/583* (2019.01)
(Continued)

(52) U.S. Cl.
CPC ........ *G06F 16/904* (2019.01); *G06F 3/04842* (2013.01); *G06F 16/583* (2019.01);
(Continued)

(58) Field of Classification Search
CPC ... G06F 16/904; G06F 16/5838; G06F 16/583
(Continued)

(56) References Cited

U.S. PATENT DOCUMENTS 7,461,077 B1 * 12/2008 Greenwood .......... G06F 3/0482
7,546,602 B2 * 6/2009 Hejlsberg ................ G06F 9/54
717/114

(Continued)

OTHER PUBLICATIONS

Ribeiro, M. T. et al., "Why Should I Trust You? Explaining the Predictions of any Classifier," in Proceedings of the 22nd ACM International Conference on Knowledge Discovery and Data Mining, 2015 (10 pages).

(Continued)

*Primary Examiner* — James Trujillo
*Assistant Examiner* — Fariborz Khoshnoodi
(74) *Attorney, Agent, or Firm* — Maginot, Moore & Beck LLP

(57) ABSTRACT

A visual analytics method and system is disclosed for visualizing an operation of an image classification model having at least one convolutional neural network layer. The image classification model classifies sample images into one of a predefined set of possible classes. The visual analytics method determines a unified ordering of the predefined set of possible classes based on a similarity hierarchy such that classes that are similar to one another are clustered together in the unified ordering. The visual analytics method displays various graphical depictions, including a class hierarchy viewer, a confusion matrix, and a response map. In each case, the elements of the graphical depictions are arranged in accordance with the unified ordering. Using the method, a user a better able to understand the training process of the model, diagnose the separation power of the different feature detectors of the model, and improve the architecture of the model.

20 Claims, 12 Drawing Sheets

(51) Int. Cl.
| | |
|---|---|
| *G06N 3/04* | (2006.01) |
| *G06K 9/62* | (2006.01) |
| *G06K 9/46* | (2006.01) |
| *G06F 3/0484* | (2013.01) |
| *G06N 3/08* | (2006.01) |
| *G06N 5/04* | (2006.01) |

(52) U.S. Cl.
CPC ....... *G06F 16/5838* (2019.01); *G06K 9/4628* (2013.01); *G06K 9/628* (2013.01); *G06K 9/6262* (2013.01); *G06K 9/6271* (2013.01); *G06N 3/0454* (2013.01); *G06N 3/084* (2013.01); *G06N 5/046* (2013.01); *G06N 3/0481* (2013.01)

(58) Field of Classification Search
USPC .................................................. 707/736, 737
See application file for complete search history.

(56) References Cited

U.S. PATENT DOCUMENTS

| | | | | |
|---|---|---|---|---|
| 2004/0042666 | A1* | 3/2004 | Ii | G06K 9/685 382/228 |
| 2005/0172278 | A1* | 8/2005 | Kuch | G06F 9/44557 717/158 |
| 2012/0170856 | A1* | 7/2012 | Yamaguchi | G06F 16/583 382/224 |
| 2012/0209134 | A1* | 8/2012 | Morita | A61B 5/04012 600/546 |
| 2016/0341731 | A1* | 11/2016 | Sood | G16B 40/00 |
| 2017/0109037 | A1* | 4/2017 | Seo | G06F 3/04883 |
| 2018/0004735 | A1* | 1/2018 | Singh | G06F 16/285 |
| 2018/0089580 | A1* | 3/2018 | Fu | G06F 16/55 |
| 2018/0097763 | A1* | 4/2018 | Garcia | H04L 51/20 |

OTHER PUBLICATIONS

Russakovsky, O. et al., "ImageNet Large Scale Visual Recognition Challenge," arXiv:1409.0575v3, 2015, accessed and retrieved Jul. 18, 2018 from Internet: https://arxiv.org/pdf/1409.0575.pdf (43 pages).
Simonyan, K. et al., "Deep Inside Convolutional Networks: Visualising Image Classification Models and Saliency Maps," arXiv:1312.6034v2, 2014, accessed and retrieved Jul. 18, 2018 from internet: https://arxiv.org/abs/1312.6034v2 (8 pages).
Smilkov, D. et al., "Direct-Manipulation Visualization of Deep Networks," in ICML Workshop on Visualization for Deep Learning, 2016 (5 pages).
Springenberg, J. T. et al., "Striving for Simplicity: The All Convolutional Net," arXiv:1412.6806v3, 2015, accessed and retrieved Jul. 18, 2018 from Internet: https://arxiv.org/abs/1412.6806v3 (14 pages).
Srivastava, N. et al., "Dropout: A Simple Way to Prevent Neural Networks from Overfitting," Journal of Machine Learning Research, vol. 15, pp. 1929-1958, 2014 (30 pages).
Stasko, J. et al., "Value-Driven Evaluation of Visualizations," In Proceedings of the Fifth Workshop on Beyond Time and Errors: Novel Evaluation Methods for Visualization (BELIV), 2014 (8 pages).
Strobelt, H. et al., "Visual Analysis of Hidden State Dynamics in Recurrent Neural Networks," arXiv:1606.07461v1, 2016, accessed and retrieved Jul. 18, 2018 from Internet: https://arxiv.org/abs/1606.07461v1 (7 pages).
Szegedy, C. et al., "Going Deeper with Convolutions," in Proceedings of the IEEE Conference on Computer Vision and Pattern Recognition (CVPR), 2015 (9 pages).
Talbot, J. et al., "EnsembleMatrix: Interactive Visualization to Support Machine Learning with Multiple Classifiers," in Proceedings of the Conference on Human Factors in Computing Systems, 2015 (10 pages).
Tan, S. et al., "Towards Implicit Complexity Control Using Variable-Depth Deep Neural Networks for Automatic Speech Recognition," In IEEE International Conference on Acoustics, Speech and Signal Processing (ICASSP), pp. 5965-5969, 2016 (5 pages).
Tzeng, F.-Y. et al., "Opening the Black Box—Data Driven Visualization of Neural Networks," In IEEE Visualization, 2005 (8 pages).
Van Den Elzen, S. et al., "Baobab View: Interactive Construction and Analysis of Decision Trees," in Proceedings of 2011 Conference on Visual Analytics Science and Technology (VAST), pp. 151-160, 2011 ().
Vedaldi, A. et al., "MatConvNet: Convolutional Neural Networks for MATLAB," arXiv:1412.4564v3, 2016, accessed and retrieved Jul. 19, 2018 from Internet: https://arxiv.org/abs/1412.4564v3 (55 pages).
Wang, J. et al., "Classification Visualization with Shaded Similarity Matrix," in IEEE Visualization, 2002 (9 pages).
Wei, D. et al., "Understanding Intra-Class Knowledge Inside CNN," arXiv:1507.02379v2, 2015, accessed and retrieved Jul. 19, 2018 from Internet: https://arxiv.org/abs/1507.02379v2 (7 pages).
Yan, Z. et al., "HD-CNN: Hierarchical Deep Convolutional Neural Network for Large Scale Visual Recognition," arXiv:1410.0736v4, 2015, accessed and retrieved Jul. 19, 2018 from Internet: https://arxiv.org/abs/1410.0736v4 (9 pages).
Yeager, L. et al., "Effective Visualizations for Training and Evaluating Deep Models," in Proceedings of the 33rd International Conference on Machine Learning, 2016 (5 pages).
Yosinski, J. et al., "Understanding Neural Networks Through Deep Visualization," in Deep Learning Workshop, 31st International Conference on Machine Learning, 2015 (12 pages).
Zeiler, M. D. et al., "Visualizing and Understanding Convolutional Networks," in Proceedings of European Conference on Computer Vision (ECCV), pp. 818-833, 2014 (16 pages).
Zhang, Z. et al., "Efficient Training of Very Deep Neural Networks for Supervised Hashing," arXiv:1511.04524v2, 2016, accessed and retrieved Jul. 19, 2019 from Internet: https://arxiv.org/abs/1511.04524v2 (9 pages).
Zhou, B. et al., "Object Detectors Emerge in Deep Scene CNNs," Published as a conference paper at ICLR, 2015 (12 pages).
Ren, D. et al., "Squares: Supporting Interactive Performance Analysis for Multiclass Classifiers," IEEE Transactions on Visualization and Computer Graphics, vol. 23, Issue 1, 2017 (10 pages).
Saxena, A., "Convolutional Neural Networks: An Illustration in TensorFlow," XRDS, vol. 22, No. 4, 2016 (3 pages).
Hubert, L., "Some Applications for Graph Theory and Related Non-metric Techniques to Problems of Approximate Sedation: The Case of Symmetric Proximity Measures," The British Journal of Mathematical & Statistical Psychology, vol. 27, Pt. 2, 1974 (21 pages).
Kruskal, J. B. et al., "Icicle Plots: Better Displays for Hierarchical Clustering," The American Statistician, vol. 37, No. 2, 1983 (7 pages).
International Search Report corresponding to International Patent Application No. PCT/EP2018/070016 (5 pages).
Kahng, M. et al., "ActiVis: Visual Exploration of Industry-Scale Deep Neural Network Models," IEEE Transactions on Visualization and Computer Graphics, 2017, retrieved from Internet: https://arxiv.org/abs/1704.01942 (10 pages).
Chung, S. et al., "ReVACNN: Real-Time Visual Analytics for Convolutional Neural Network," KDD 2016 Workshop on Interactive Data Exploration and Analytics, 2016 (7 pages).
Alsallakh, B. et al., "Visual Methods for Analyzing Probabilistic Classification Data," in IEEE Transactions on Visualization and Computer Graphics, 2014 (10 pages).
Amershi, S. et al., "ModelTracker: Redesigning Performance Analysis Tools for Machine Learning," In Proceedings of the 33rd Annual ACM Conference on Human Factors in Computing Systems, 2015 (10 pages).
Aubry, M. et al., "Understanding deep features with computer-generated imagery," in IEEE International Conference on Computer Vision (ICCV), 2015, accessed and retrieved Jul. 17, 2018 from internet: https://arxiv.org/pdf/1506.01151.pdf, arXiv:1506.01151v1 (10 pages).
Bach, S. et al., "On Pixel-Wise Explanations for Non-Linear Classifier Decisions by Layer-Wise Relevance Propagation," PLoS One, vol. 10, Issue 7, 2015 (46 pages).

(56) References Cited

OTHER PUBLICATIONS

Beauxis-Aussaket, E. et al., "Visualization of Confusion Matrix for Non-Expert Users," In IEEE Conference on Visual Analytics Science and Technology (VAST), 2014 (2 pages).
Behrisch, M. et al., "Matrix Reordering Methods for Table and Network Visualization," Computer Graphics Forum, vol. 35, Issue 3, 2016 (24 pages).
Bendale, A. et al., "Towards Open Set Deep Networks," 2015, accessed and retrieved Jul. 17, 2018 from internet: https://arxiv.org/abs/1511.06233, arXiv:1511.06233 (14 pages).
Brasselet, R. et al., "Optimal context separation of spiking haptic signals by second-order somatosensory neurons," In Advances in Neural Information Processing Systems (NIPS), 2009 (13 pages).
Brooks, M. et al., "FeatureInsight: Visual Support for Error-Driven Feature Ideation in Text Classification," In 2015 IEEE Conference on Visual Analytics Science and Technology (VAST), 2015 (8 pages).
Bruckner, D. et al., "ML-o-scope: a diagnostic visualization system for deep machine learning pipelines," Technical Report, University of California at Berkeley, 2014 (11 pages).
Cao, N. et al., "UnTangle Map: Visual Analysis of Probabilistic Multi-Label Data," IEEE Transactions on Visualization and Computer Graphics, 2015 (14 pages).
Chung, S. et al., "ReVACNN: Steering Convolutional Neural Network via Real-Time Visual Analytics," In NIPS Workshop—The Future of Interactive Machine Learning, 2016 (8 pages).
Dalal, N. et al., "Histograms of Oriented Gradients for Human Detection," In IEEE Computer Society Conference on Computer Vision and Pattern Recognition (CVPR), 2005 (8 pages).
Deng, J. et al., "What Does Classifying More Than 10,000 Image Categories Tell Us?," ECCV 2010, Part V, LNCS 6315, pp. 71-84, 2010 (14 pages).
Deng, J. et al., "ImageNet: A Large-Scale Hierarchical Image Database," In IEEE Conference on Computer Vision and Pattern Recognition (CVPR), 2009 (8 pages).
Donahue, J. et al., "DeCAF: A Deep Convolutional Activation Feature for Generic Visual Recognition," in Proceedings of the 31st International Conference on Machine Learning, 2014 (9 pages).
Dosovitskiy, A. et al., "Inverting Visual Representations with Convolutional Networks," In Proceedings of the IEEE Conference on Computer Vision and Pattern Recognition (CVPR), 2016 (9 pages).
Elmqvist, N. et al., "ZAME: Interactive Large-Scale Graph Visualization," in 2008 IEEE Pacific Visualization Symposium, 2008 (8 pages).
Erhan, D. et al., "Why Does Unsupervised Pre-training Help Deep Learning?," Journal of Machine Learning Research, vol. 11, pp. 625-660, 2010 (36 pages).
Erhan, D. et al., "The Difficulty of Training Deep Architectures and the Effect of Unsupervised Pre-Training," in Proceedings of the 12th International Conference on Artificial Intelligence and Statistics (AISTATS) 2009, pp. 153-160, 2009 (8 pages).
Escalera, S. et al., "Chalearn Looking at People Challenge 2014: Dataset and Results," in Workshop at European Conference on Computer Vision (ICCV), 2014 (15 pages).
Griffin, G. et al., "Learning and Using Taxonomies for Fast Visual Categorization," in IEEE Conference on Computer Vision and Pattern Recognition (CVPR), pp. 1-8, 2008 (8 pages).
Grün, F. et al., "A Taxonomy and Library for Visualizing Learned Features in Convolutional Neural Networks," in Proceedings of 33rd International Conference on Machine Learning, vol. 48, 2016 (8 pages).
Guattery, S. et al., "On the Quality of Spectral Separators," SIAM Journal on Matrix Analysis and Applications, 1998 (19 pages).
Harley, A. W. et al., "An Interactive Node-Link Visualization of Convolutional Neural Networks," ISVC 2015, Part I, LNCS 9474, pp. 867-877, 2015 (11 pages).
Hinton, G. et al., "Distilling the Knowledge in a Neural Network," arXiv:1503.02531v1, 2015, accessed and retrieved Jul. 17, 2018 from Internet: https://arxiv.org/pdf/1503.02531.pdf (9 pages).

Ioannou, Y. et al., "Decision Forests, Convolutional Networks and the Models in-Between," arXiv:1603.01250v1, 2016, accessed and retrieved Jul. 17, 2018 from Internet: https://arxiv.org/pdf/1603.01250.pdf (9 pages).
Jaderberg, M. et al., "Deep Features for Text Spotting," In European Conference on Computer Vision (ECCV), 2014 (17 pages).
Jia, Y. et al., "Caffe: Convolutional Architecture for Fast Feature Embedding," arXiv:1408.5093v1, 2014, accessed and retrieved from Internet: https://arxiv.org/pdf/1408.5093.pdf (4 pages).
Joshi, A. J. et al., "Scalable Active Learning for Multi-Class Image Classification," IEEE Transactions on Pattern Analysis and Machine Intelligence, 2012 (14 pages).
Kapoor, A. et al., "Interactive Optimization for Steering Machine Classification," In Proceedings of the SIGCHI Conference on Human Factors in Computing Systems, 2010 (10 pages).
Krizhevsky, A. et al., "ImageNet Classification with Deep Convolutional Neural Networks," In Advances in Neural Information Processing Systems (NIPS), 2012 (9 pages).
Lecun, Y. et al., "Deep Learning," Naute, vol. 521, pp. 436-443, 2015 (8 pages).
Lecun, Y. et al., "Gradient-Based Learning Applied to Document Recognition," in Proceedings of the IEEE, 1998 (46 pages).
Lecun, Y. et al., "Efficient BackProp," in Neural Networks: Tricks of the Trade, 1998 (44 pages).
Liu, M. et al., "Towards Better Analysis of Deep Convolutional Neural Networks," arXiv:1604.07043v3, 2017, accessed and retrieved Jul. 18, 2018 from Internet: https://arxiv.org/pdf/1604.07043.pdf (10 pages).
Liu, S. et al., "Towards Better Analysis of Machine Learning Models: A Visual Analytics Perspective," arXiv:1702.01226v1, 2017, accessed and retrieved Jul. 18, 2018 from internet: https://arxiv.org/pdf/1702.01226.pdf (23 pages).
Lowe, D. G., "Object Recognition from Locale Scale-Invariant Features," in Proceedings of International Conference on Computer Vision, 1999 (8 pages).
Mahendran, A. et al., "Understanding Deep Image Representations by Inverting Them," In Proceedings of the IEEE Conference on Computer Vision and Pattern Recognition (CVPR), 2015 (9 pages).
Mahendran, A. et al., "Visualizing deep convolutional neural networks using natural pre-images," arXiv:1512.02017v3, 2016, accessed and retrieved Jul. 18, 2018 from internet: https://arxiv.org/pdf/1512.02017v3.pdf (25 pages).
Mäkinen, E. et al., "The Barycenter Heuristic and the Reorderable Matrix," Informatica, vol. 29, pp. 357-363, 2005 (7 pages).
Miller, G. A., "WordNet: A Lexical Database for English," Communications of the ACM, vol. 38, Issue 11, pp. 39-41, 1995 (3 pages).
Murthy, V. N. et al., "Deep Decision Network for Multi-Class Image Classification," In Proceedings of the IEEE Conference on Computer Vision and Pattern Recognition (CVPR), 2016 (9 pages).
Nguyen, A. et al., "Synthesizing the preferred inputs for neurons in neural networks via deep generated networks," in Proceedings of 30th Conference on Neural Information Processing Systems (NIPS), 2016 (9 pages).
Nguyen, A. et al., "Deep Neural Networks are Easily Fooled: High Confidence Predictions for Unrecognizable Images," arXiv:1412.1897v4, accessed and retrieved Jul. 18, 2018 from internet: https://arxiv.org/pdf/1412.1897.pdf, 2015 (20 pages).
Nguyen, A. et al., "Multifaced Feature Visualization: Uncovering the Different Types of Features Learned by Each Neuron in Deep Neural Networks," in Proceedings of 33rd International Conference on Machine Learning, 2015 (22 pages).
Oelke, D. et al., "Visual Boosting in Pixel-based Visualization," Proceedings of Eurographics/IEEE Symposium on Visualization, vol. 30, No. 3, 2011 (10 pages).
Song, H. O. et al., "Deep Metric Learning via Lifted Structured Feature Embedding," In Proceedings of the IEEE Conference on Computer Vision and Pattern Recognition (CVPR), 2016 (9 pages).
Patel, K. et al., "Gestalt: Integration Support for Implementation and Analysis in Machine Learning," in Proceedings of 23rd annual ACM Symposium on User Interface Software and Technology (UIST), 2010 (10 pages).

(56) References Cited

OTHER PUBLICATIONS

Rauber, P. E. et al., "Visualizing the Hidden Activity in Artificial Neural Networks," in IEEE Transactions on Visualization and Computer Graphics, vol. 23, No. 1, 2017 (10 pages).

* cited by examiner

VISUAL ANALYTICS SYSTEM FOR CONVOLUTIONAL NEURAL NETWORK BASED CLASSIFIERS

This application claims the benefit of priority of U.S. provisional application Ser. No. 62/537,613, filed on Jul. 27, 2017 the disclosure of which is herein incorporated by reference in its entirety.

FIELD

The device and method disclosed in this document relates to convolutional neural networks and, more particularly, to visual analytics for convolutional neural networks.

BACKGROUND

Unless otherwise indicated herein, the materials described in this section are not prior art to the claims in this application and are not admitted to the prior art by inclusion in this section.

Object recognition is a fundamental problem in computer vision that involves classifying an image into a pre-defined number of classes. Convolutional Neural Networks (CNNs) have achieved state-of-the-art results on this problem, thanks to the availability of large and labeled datasets and of powerful computation infrastructure. CNNs automatically extract discriminative classification features from the training images and use them in combination to recognize complex objects. This enables CNNs to significantly outperform traditional computer vision approaches on large-scale datasets such as ImageNet, as the latter usually rely on heuristic features.

To make CNNs applicable to critical domains, it is important to evaluate the reliability of the features they learn and to understand possible reasons behind classification errors. A number of techniques have been proposed to visualize these features in the image space. However, little focus has been given to visualization of the classification error itself and to refine CNNs accordingly.

SUMMARY

A method for visualizing an operation of an image classification model having a plurality of neural network layers including at least one convolutional layer is disclosed. The method comprises: receiving, with a processor, a plurality of actual class labels, each actual class label being associated with a respective sample image in a plurality of sample images, each actual class label corresponding to one of a predefined plurality of classes; receiving, with the processor, a plurality of outputs of the image classification model, each output being provided by the image classification model responsive to a respective sample image in the plurality of sample images; determining, with the processor, a sequential ordering of the predefined plurality of classes based on a similarity hierarchy of the classes in the predefined plurality of classes, the similarity hierarchy defining a plurality of groups of similar classes in the predefined plurality of classes; and displaying, with a display device, a graphical depiction of the plurality of outputs, the graphical depiction including graphical elements encoding the plurality of outputs which are visually arranged according to the determined sequential ordering of the predefined plurality of classes.

A visual analytics system for visualizing an operation of an image classification model having a plurality of neural network layers including at least one convolutional layer is disclosed. The visual analytics system comprises: a display device; a memory configured to store a plurality of sample images and a plurality of actual class labels, each actual class label being associated with a respective sample image in the plurality of sample images, each actual class label corresponding to one of a predefined plurality of classes; and a processor operatively connected to the display device and the memory. The processor is configured to: receive the plurality of actual class labels from the memory; receive a plurality of outputs of the image classification model, each output being provided by the image classification model responsive to a respective sample image in the plurality of sample images; determine a sequential ordering of the predefined plurality of classes based on a similarity hierarchy of the classes in the predefined plurality of classes, the similarity hierarchy defining a plurality of groups of similar classes in the predefined plurality of classes; and operate the display device to display a graphical depiction of the plurality of outputs, the graphical depiction including graphical elements encoding the plurality of outputs which are visually arranged according to the determined sequential ordering of the predefined plurality of classes.

BRIEF DESCRIPTION OF THE DRAWINGS

The foregoing aspects and other features of the method and system are explained in the following description, taken in connection with the accompanying drawings.

DETAILED DESCRIPTION

Figure 1:
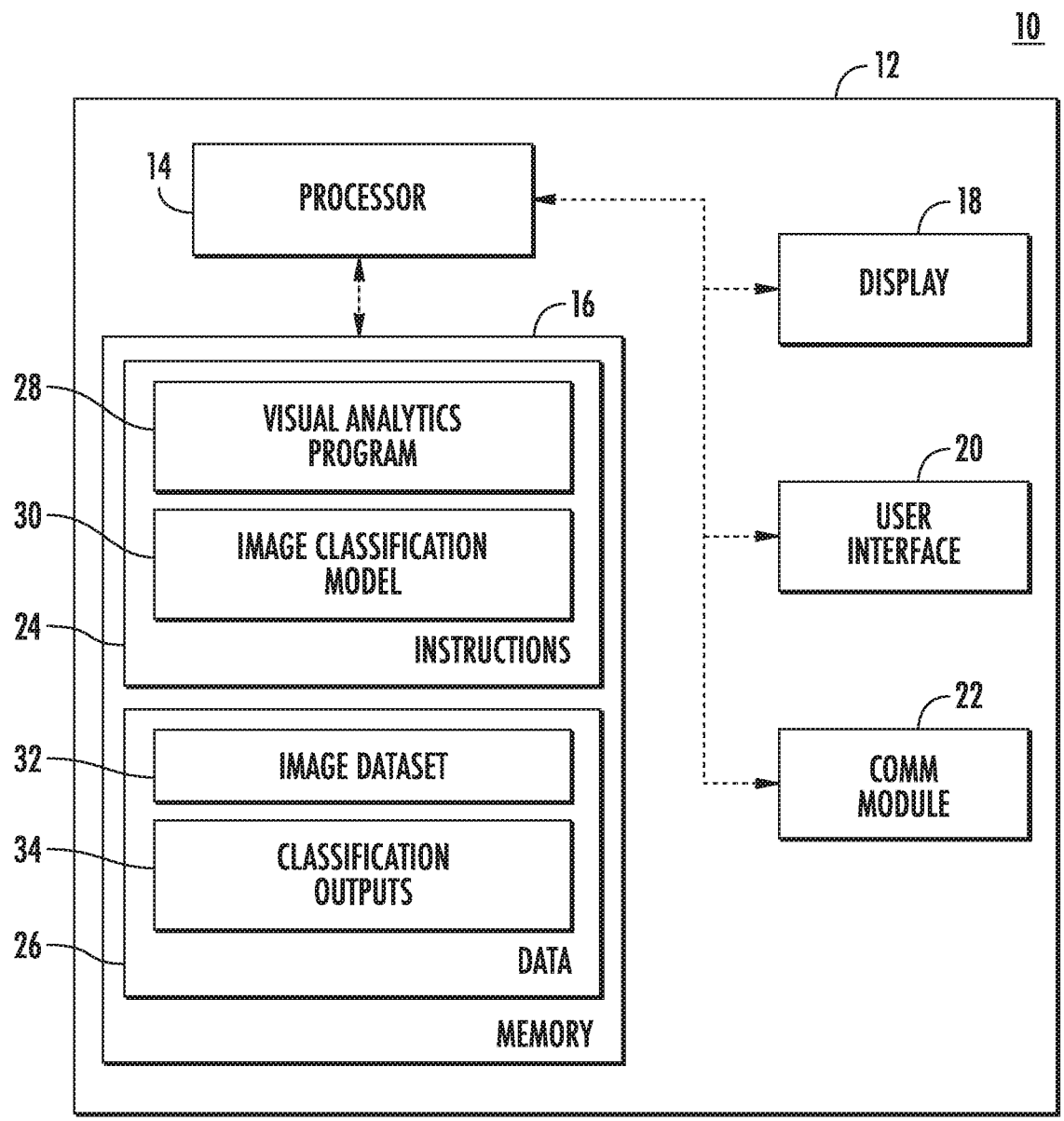
FIG. 1 shows a block diagram of an exemplary embodiment of a visual analytics system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Visual Analytics System

FIG. 1 shows a block diagram of an exemplary embodiment of a visual analytics system 10 for visualizing a performance, operation, and outputs of a convolutional neural network (CNN) based image classification model. The visual analytics system 10 is typically provided in a housing, cabinet, or the like 12 that is configured in a typical manner for a computing device. In the illustrated embodiment, the visual analytics system 10 includes a processor 14, memory 16, a display 18, a user interface 20, and a network communications module 22. It will be appreciated, however, that the illustrated embodiment of the visual analytics system 10 is only one exemplary embodiment of a visual analytics system 10 and is merely representative of any of various manners or configurations of a visual analytics system, personal computer, laptop computer, server, or any other data processing systems that are operative in the manner set forth herein.

The processor 14 is configured to execute instructions to operate the visual analytics system 10 to enable the features, functionality, characteristics and/or the like as described herein. To this end, the processor 14 is operably connected to the memory 16, display 18, the user interface 20, and the network communications module 22. The processor 14 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 14 may include a system with a central processing unit, multiple processing units, or dedicated circuitry for achieving specific functionality.

The memory 16 may be of any type of device capable of storing information accessible by the processor 14, such as a memory card, ROM, RAM, write-capable memories, read-only memories, hard drives, discs, flash memory, or any of various other computer-readable medium serving as data storage devices as will be recognized by those of ordinary skill in the art. The memory 16 is configured to store program instructions 24 for execution by the processor 14, as well as data 26.

The program instructions 24 at least include a visual analytics program 28. In one embodiment, the program instructions 24 further include a convolutional neural network (CNN) based image classification model 30. In at least one embodiment, the data 26 includes an image dataset 32 having a plurality of images, each having a respective class labels from a defined number (e.g., 1000) of possible classes. The image dataset 32 is analyzable by the image classification model 30 to predict a class of each respective image. In at least one embodiment, the data 26 includes classification outputs 34 of the image classification model 30 with respect the image dataset 32, such as predicted class labels, responses of individual neurons of different convolutional layers, etc. The visual analytics program 28 is configured to enable a user to visualize the performance, operation, and outputs of the image classification model 30.

The network communication module 22 of the visual analytics system 10 provides an interface that allows for communication with any of various devices using various means. In particular, the network communications module 22 may include a local area network port that allows for communication with any of various local computers housed in the same or nearby facility. In some embodiments, the network communications module 22 further includes a wide area network port that allows for communications with remote computers over the Internet. Alternatively, the visual analytics system 10 communicates with the Internet via a separate modem and/or router of the local area network. In one embodiment, the network communications module is equipped with a Wi-Fi transceiver or other wireless communications device. Accordingly, it will be appreciated that communications with the visual analytics system 10 may occur via wired communications or via the wireless communications. Communications may be accomplished using any of various known communications protocols.

The visual analytics system 10 may be operated locally or remotely by a user. To facilitate local operation, the visual analytics system 10 may include the display 18 and the user interface 20. Via the user interface 20, a user may access the instructions, including the visual analytics program 28, and may collect data from and store data to the memory 16. In at least one embodiment, the display 18 may include an LCD display screen or the like. In at least one embodiment, the user interface 20 may suitably include a mouse or other pointing device, a keyboard or other keypad, speakers, and a microphone, as will be recognized by those of ordinary skill in the art. It will be appreciated that the display 18 and the user interface 20 may be integrated on or within the housing 12 or may be external devices which are operably connected via a connector arranged on the housing 12 (not shown). Alternatively, in some embodiments, a user may operate the visual analytics system 10 remotely from another computing device which is in communication therewith via the network communication module 22 and has an analogous display and user interface.

Visual Analytics Program

Methods for operating the visual analytics system 10 are described below. In particular, methods of operating the processor 14 and/or the display 18 to provide a visual analytics program are described. In the description of the methods, statements that a method is performing some task or function refers to a controller or general purpose processor (e.g., the processor 14) executing programmed instructions (e.g. the visual analytics program 28 and/or the image classification model 30) stored in non-transitory computer readable storage media (e.g., the memory 16) operatively connected to the controller or processor to manipulate data or to operate one or more components in the visual analytics system 10 to perform the task or function. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

Additionally, various graphical elements and visual interfaces are described. Description of a particular feature or arrangement of the graphical elements refers an operation of the processor 12 and/or the display 18 to display said graphical elements in the manner described. Additionally, various user interactions, such as selecting or clicking various options, buttons, or other graphical elements are also described, which refer to usage of one or more components of the user interface 20, such as a mouse or keyboard, in any conventional manner to enable user interactions with graphical elements and refers to the processor 12 receiving a signal indicating said user interactions from the user interface 20 and performing a described operation in response thereto.

As discussed above, the visual analytics system 10 includes a visual analytics program 28 stored in the memory 16. The visual analytics program 28 is configured to enable to visual analytics system 10 to allow a user to visualize the performance, operation, training, intermediate outputs, final outputs, etc. of the image classification model 30. As will be discussed in further detail below, the visual analytics program 28 improves upon conventional visual analytics methods by enabling the user to investigate a defined or implicit class hierarchy and to analyze its impact on class confusion patterns and feature detectors developed at each layer in the convolutional neural networks of the image classification model 30.

Figure 2:
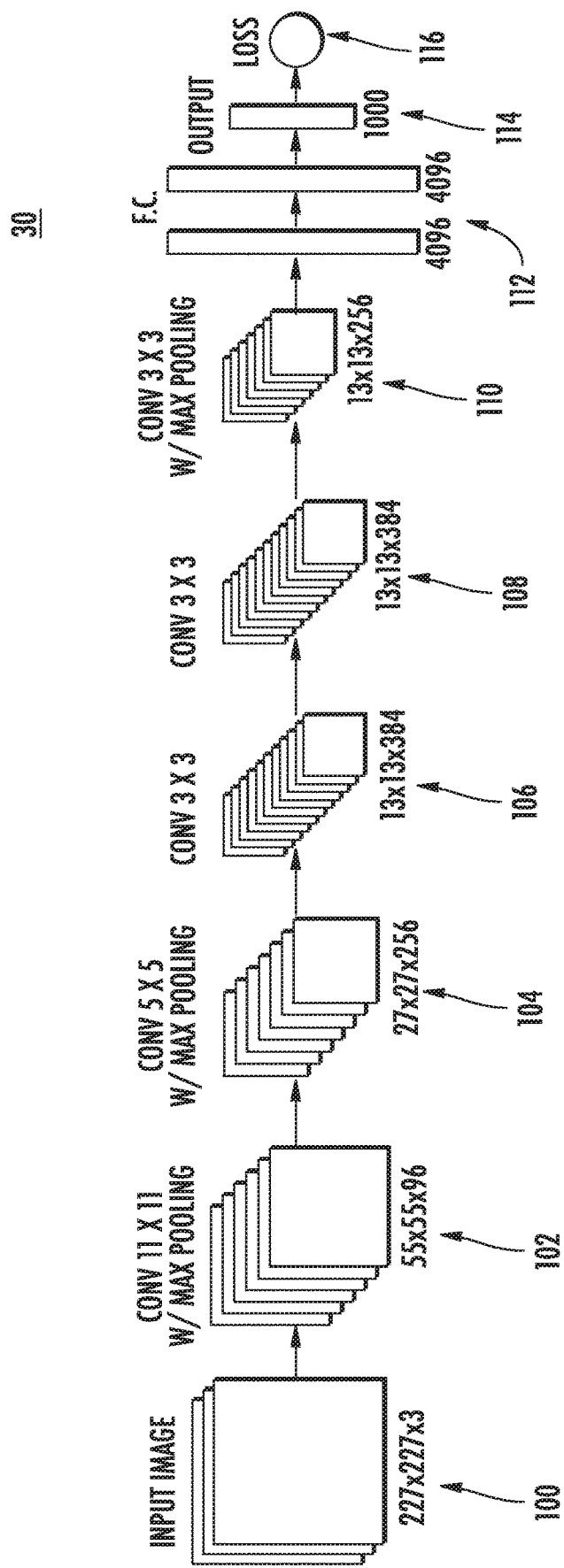
FIG. 2 shows an exemplary image classification model having at least one convolutional neural network (CNN).

FIG. 2 shows an exemplary image classification model 30 having at least one convolutional neural network (CNN). CNNs are a special type of feed-forward neural networks that contain a number of convolutional layers. A convolutional layer acts as learnable filter that responds to certain features when convolved with a 2D input, producing a filtered 2D output. In the illustrated embodiment, the image classification model 30 is configured to receive two-dimensional (2D) input images 100, such as images from the image dataset 32. A first convolutional layer 102 is applied to the input images 100 and subsequent convolutional layers 104, 106, 108, and 110 are applied to the output of the respective preceding layer. Max pooling is applied after the first, second, and fifth convolutional layers 102, 104, and 110 to reduce the dimensionality of the respective outputs. However, the third and fourth convolutional layers 106 and 108 are connected without any max pooling. The output of the fifth convolutional layer 110 is provided to fully connected layers 112. A Rectified Linear Unit (ReLU) non-linear activation is applied to the output of each convolutional layer 102, 104, 106, 108, and 110 and each fully connected layer 112. The output of the last fully connected layer is fed to a 1000-way soft-max output layer 114, which produces a probability distribution over 1000 different possible class labels. During training, a plurality of images, such as those of the image dataset 32, which are labeled with one of the 1000 different class labels are provided to the image classification model 30. Kernal values of the convolutional filters are learned and/or optimized over one or more epochs by minimizing a loss function 116. It will be appreciated that the illustrated image classification model 30 is merely exemplary, and that the visual analytics program 28 is operable with any CNN-based image classifier having a plurality of neural network layers including at least one convolutional layer.

After training the image classification model 30, the convolutional layers 102, 104, 106, 108, and 110 become feature detectors with respect to the input image 100. Appropriate visualization techniques can reveal the features from the input images these learned filters respond to.

The visual analytics program 28 advantageously integrates three facets of the classification data (i.e., the image dataset 32 and the classification outputs 34) when inspecting the image classification model 30: input samples, internal representations, and classification results. The visual analytics program 28 enables scalable inspection of these three facets of the classification data in order to: identify various sources of classification error; exploit hierarchical structure of the classes to improve the model architecture, training process, and accuracy; and analyze the model's sensitivity to data variation and curate a balanced training data that improves its robustness.

Being the target of classification, the class information is the most salient information along the classification pipeline. It is present both in the labeled input and in the output, and it largely determines the features learned by the convolutional layers of the image classification model 30. Classes have varying degrees of discriminability. Some classes have unique features such as strawberries and zebras, while other classes might share similar features and are hence harder to distinguish from each other. Such similarity structures in the data are very valuable information that could potentially lead to improve classifiers.

With a growing number of classes, the similarity structures between them become complex. A key observation about these similarity structures is that they are often hierarchical in nature, and classes within the same branch of the hierarchy are increasingly more similar to each other than to other classes. The visual analytics program 28 enables a user to easily reveal and analyze the hierarchical similarity structure among the classes and on analyzing how it impacts both the classification results and the particular image features the convolutional layers learn to recognize.

Figure 3:
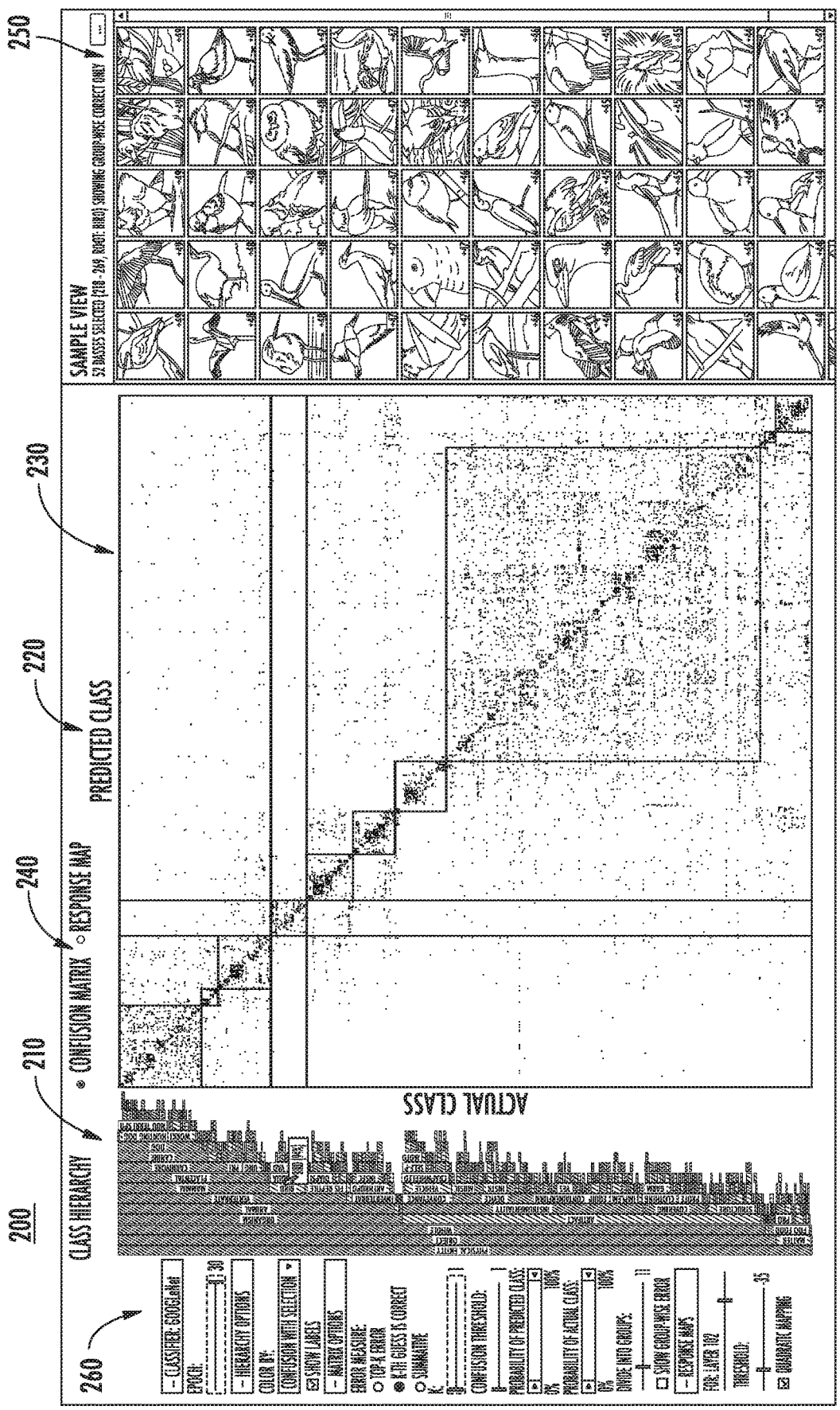
FIG. 3 shows an overview of an exemplary main user interface of the visual analytics program.
Figure 7:
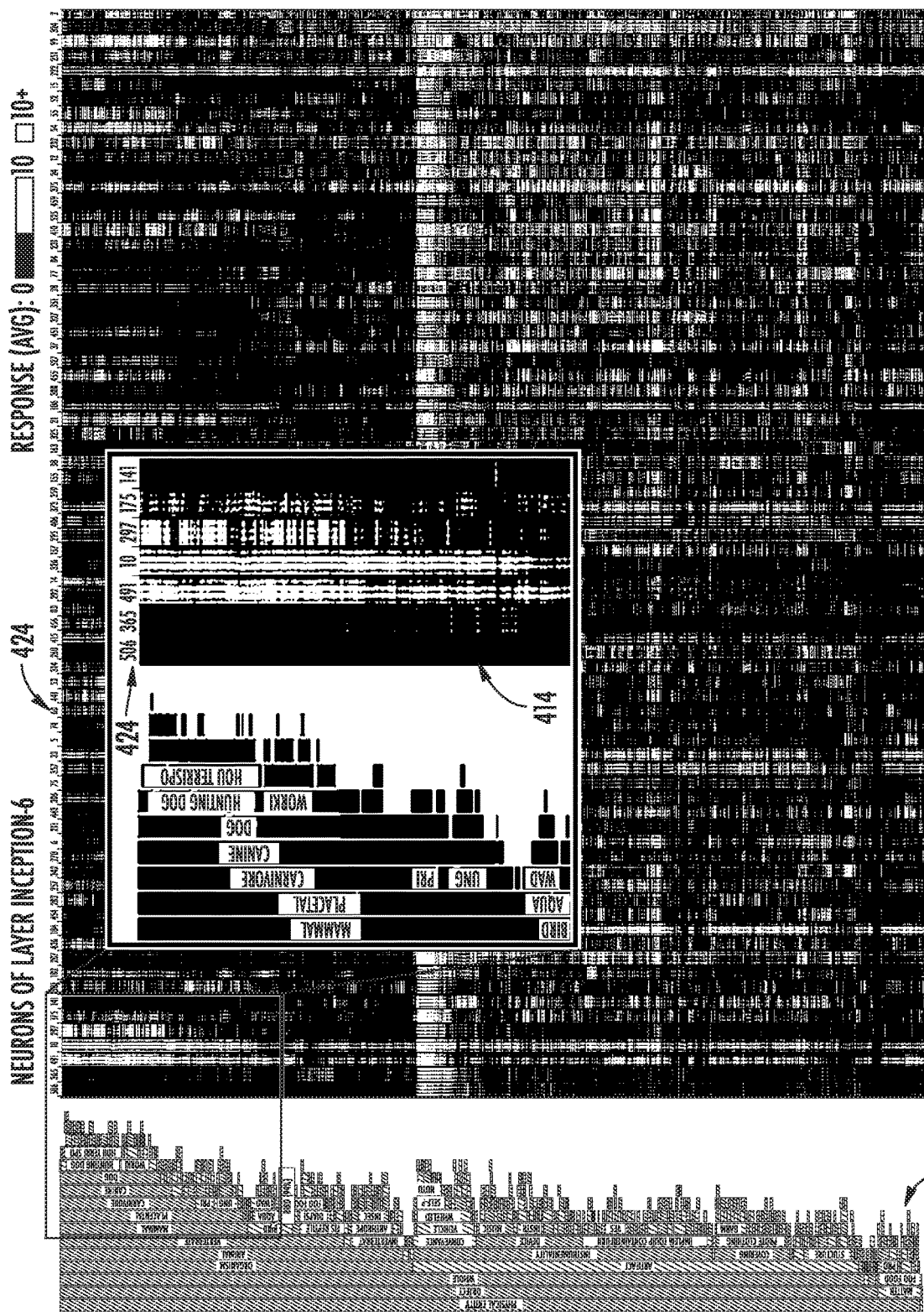
FIG. 7 shows a detailed view of the response map of the main user interface.

FIG. 3 shows an overview of an exemplary main user interface 200 of the visual analytics program 28. The main user interface 200 consists of four primary graphical components that show different facets of the data. First, the main user interface 200 includes a class hierarchy viewer 210 configured to illustrate a hierarchy of a plurality of possible class labels that can be assigned to images of the image dataset 32. The main user interface 200 further includes a main window 220 that provides either a confusion matrix 230 (as shown) or a response map 235 (shown only in FIG. 7). An option 240 is provided in the main user interface 200, which enables a user to selectively switch between displaying the confusion matrix 230 (as shown) and displaying the response map 235 in the main window 220. The confusion matrix 30 compares an actual class label with a predicted class label for each sample image in the image dataset 32 (i.e. final outputs of the model 30). In contrast, the response map 235, which is shown in FIG. 7, shows an average response of different neurons of a selected neural network layer of the image classification model 30 to each class of images from the image dataset 32 (i.e. intermediate outputs of the model 30). The class hierarchy viewer 210, the confusion matrix 230, and the response map 235 each show outputs aggregated at the class level and are visually arranged according to a unified class ordering, dictated by the class hierarchy. Finally, the main user interface 200 further includes a sample viewer 250 which shows exemplary sample images from the image dataset 32 corresponding to a user selection in the class hierarchy viewer 210, the confusion matrix 230, or the response map 235. In one embodiment, the main user interface 200 further includes a settings menu 260 having a plurality of options for adjusting features of the class hierarchy viewer 210, the confusion matrix 230, the response map, or the sample viewer 250. The illustrated options are merely exemplary and any of the settings, buttons, options, and parameters discussed herein may be adjustable via a graphical element in the settings menu 260. Each of the four primary graphical components of the main user interface 200 contributes to varying degrees to the high-level analysis tasks discussed above, including: identifying various sources of classification error; exploiting hierarchical structure of the classes to improve the model architecture, training process, and accuracy; and analyzing the model's sensitivity to data variation and curate a balanced training data that improves its robustness.

Figure 4:
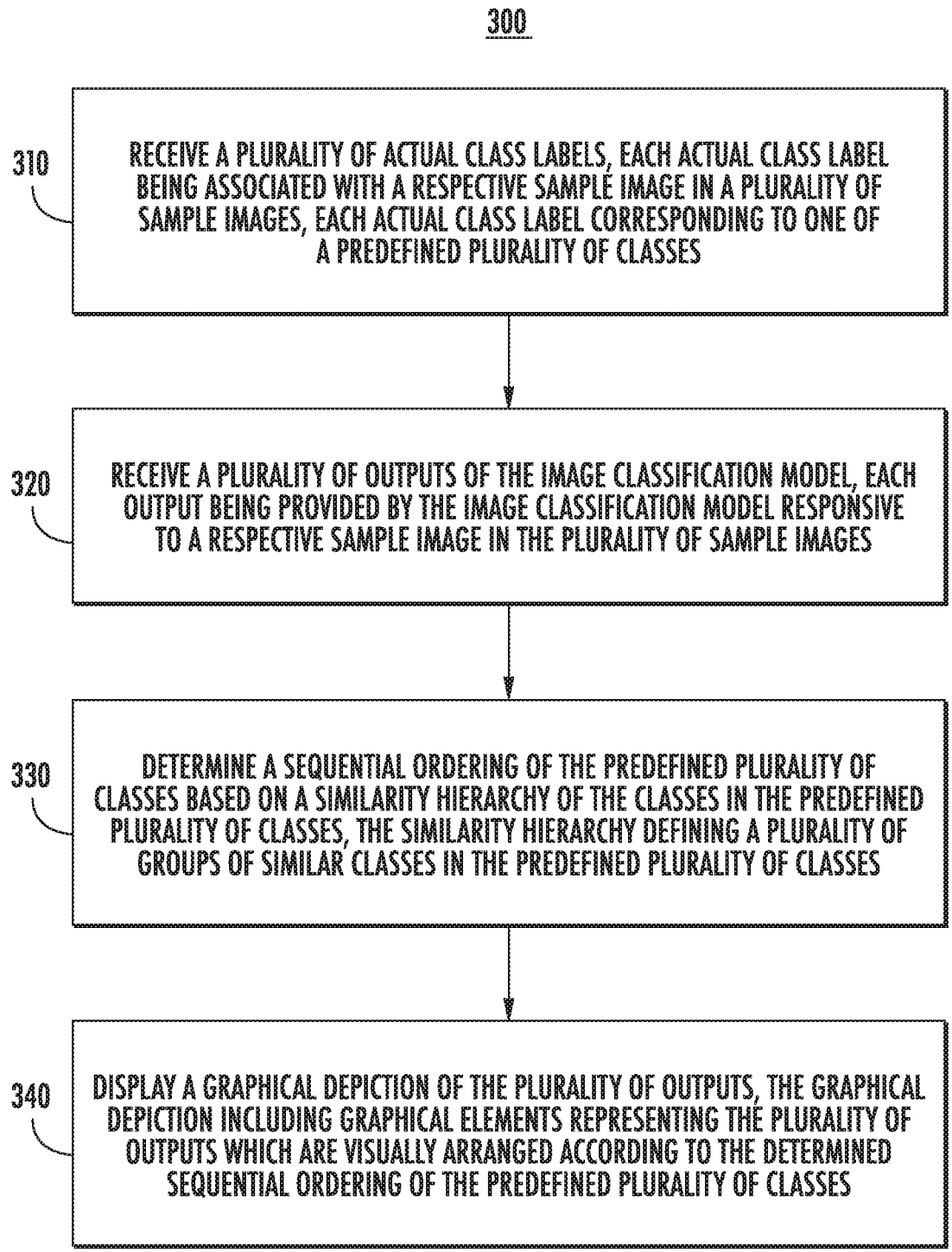
FIG. 4 shows a logical flow diagram for a method for visualizing an operation of an image classification model having at least one convolutional layer.

FIG. 4 shows a logical flow diagram for a method 300 for visualizing an operation of an image classification model having a plurality of neural network layers including at least one convolutional layer. The method 300 improves upon the functioning of the visual analytics system 10 and, more particularly, the functioning of the processor 14 of the visual analytics system 10, by advantageously providing a graphical depiction of the outputs of the image classification model 30 in which the graphical elements representing the outputs are visually arranged according a similarity of the class labels. In this way, output data for similar classes of images is clustered together, which makes it easier to identify sources of classification error.

The method 300 begins with a step of receiving a plurality of actual class labels, each actual class label being associated with a respective sample image in a plurality of sample images, each actual class label corresponding to one of a predefined plurality of classes (block 310). Particularly, with respect to the embodiments described in detail herein, the processor 14 of the visual analytics system 10 is configured to execute program instructions of the visual analytics program 28 to receive and/or read from the memory 16 a plurality of actual class labels associated with a corresponding plurality of sample images from the image dataset 32. In at least one embodiment, each class label is stored in the memory 16 in association with the corresponding image from the image dataset 32. In at least one embodiment, each class label is one of a predefined and closed set of possible class labels (e.g., 1000 possible classes). In some cases, the processor 14 receives class labels for all of the images from the image dataset 32. In other cases, the processor 14 receives class labels for only a particular selected subset of the images from the image dataset 32. The plurality of images for which a class label is received may be referred to herein as the sample images from the image dataset 32, for which data will be processed and depicted graphically by the visual analytics program 28.

The method 300 continues with a step of receiving a plurality of outputs of the image classification model, each output being provided by the image classification model responsive to a respective sample image in the plurality of sample images (block 320). Particularly, with respect to the embodiments described in detail herein, the processor 14 is configured to execute program instructions of the visual analytics program 28 to receive and/or read from the memory 16 a plurality of outputs from at least one neural network layer of the image classification model 30 responsive to each sample image from the image dataset 32 for which a class label was received. In at least one embodiment, for each sample image, the received output includes a final output of output layer 114 of the image classification model comprises a probability distribution across each possible class label. In at least one embodiment, for each sample image, the received output comprises a predicted class label for the respective image, corresponding to the most probable class label according to the final output of output layer 114.

In at least one embodiment, for each sample image, the received output comprises an intermediate output of some intermediate layer of the image classification model 30. In at least one embodiment, for each sample image, the received output comprises a response and/or activation of one or more neurons of one or more selected convolutional layers 102, 104, 106, 108, or 110. In at least one embodiment, for each sample image, the received output comprises a response and/or activation of the neurons of individual filters and/or kernels of one or more particular convolutional layers 102, 104, 106, 108, or 110. In at least one embodiment, for each sample image, the received output comprises a response and/or activation of individual neurons of one or more particular neural network layers 102, 104, 106, 108, 110, or 112.

In at least one embodiment, the processor 14 is configured execute instructions of the image classification model 30 to generate the above described outputs with respect to each of the sample images. In one embodiment, the processor 14 is configured to store the outputs in the memory 16 (i.e., the classification outputs 34) for later usage by the visual analytics program 28. However, in some embodiments, the above described outputs may be generated by some external computing device and the processor 14 is configured to operate the network communication module 22 to receive the outputs from the external computing device.

The method 300 continues with a step of determining a sequential ordering of the predefined plurality of classes based on a similarity hierarchy of the classes in the predefined plurality of classes, the similarity hierarchy defining a plurality of groups of similar classes in the predefined plurality of classes (block 330). Particularly, with respect to the embodiments described in detail herein, the processor 14 is configured to execute program instructions of the visual analytics program 28 to determine a sequential ordering of the predefined set of possible class labels. The processor 14 is configured to determine the sequential ordering of the possible class labels based on a similarity hierarchy of the possible class labels. As used herein a "similarity hierarchy" refers to one or more groups of similar classes and/or group labels assigned to groups of similar class labels. For example, a group label "bee" may be assigned to a group of class labels including the class labels "honey bee," and "bumble bee." Additionally, the similarity hierarchy may include groups of similar groups and/or group labels assigned to a group of similar group labels. For example, a group label "vertebrate" may be assigned to a group of group labels including the group labels "fish," "reptile," "bird," and "mammal." In some embodiments, a pre-defined class hierarchy may be available for the image dataset 32 and the set of possible class labels. However, in some embodiments, the processor 14 is configured to use a seriation algorithm to determine the hierarchy. In some embodiments, as discussed further below, the user may interactively define the hierarchy using the main user interface 200.

Based on the similarity hierarchy, the processor 14 is configured to determine the sequential ordering of the possible class labels. In at least one embodiment, the processor 14 is configured to include class labels associated with a common group label adjacent to one another and/or clustered together in the sequential ordering. In at least one embodiment, the processor 14 is configured to include groups of class labels associated with a common group of group labels adjacent to one another and/or clustered together in the sequential ordering. For example, consider a set of possible class labels that includes "eagle," "cat," "frog," "dog," "crocodile," and "humming bird." The group labels of the similarity hierarchy define that "cat" and "dog" are a "mammal," that "frog" and "crocodile" are a "reptile," that "eagle" and "humming bird" are a "bird," and that "mammal," "reptile," and "bird" are an "animal." Given the exemplary set of possible class labels and exemplary similarity hierarchy, the processor 14 might determine the sequential ordering as: (1) "eagle," (2) "humming bird," (3) "cat," (4) "dog," (5) "crocodile," and (6) "frog." As can be seen, the classes of each group "mammal," "reptile," and "bird" are clustered together and the all classes in the broader group "animal" are clustered together The method 300 continues with a step of displaying a graphical depiction of the plurality of outputs, the graphical depiction including graphical elements representing the plurality of outputs which are visually arranged according to the determined sequential ordering of the predefined plurality of classes (block 340). Particularly, with respect to the embodiments described in detail herein, the processor 14 is configured to execute program instructions of the visual analytics program 28 to operate the display 18 to display a graphical depiction of the plurality of outputs received with respect to the sample images. The graphical depiction includes a plurality of graphical elements representing the outputs. The processor 14 is configured to arrange the outputs and/or the graphical elements representing the outputs according to the determined sequential ordering of the class labels in the graphical depiction. At least the class hierarchy viewer 210, the confusion matrix 230, and the response map 235 introduced above are exemplary embodiments of such a graphical depiction. In each case, the outputs and/or the graphical elements representing the outputs are aggregated at the class level and arranged according to the determined sequential ordering. The class hierarchy viewer 210, the confusion matrix 230, and the response map 235 are described in greater detail below using an exemplary image dataset, each labeled with one of a thousand possible class labels.

Class Hierarchy Viewer

Figure 5:
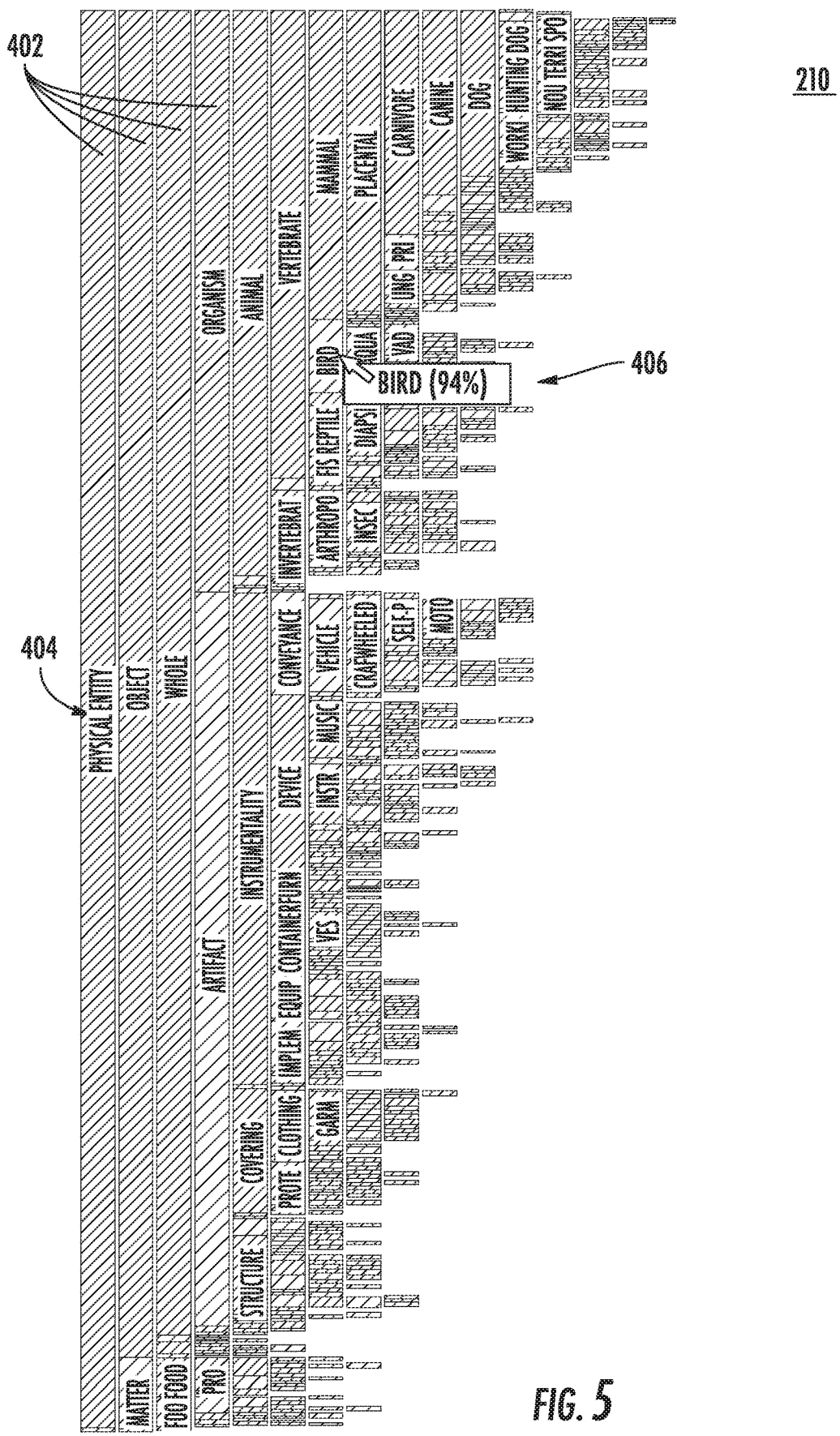
FIG. 5 shows a detailed view of the class hierarchy viewer of the main user interface.

FIG. 5 shows a detailed view of the class hierarchy viewer 210 of the main user interface 200. The class hierarchy viewer 210 is displayed adjacent to the main window 220 of the main user interface 200 (to the left as shown) and indicates the class ordering along the vertical dimension of the confusion matrix 230 and/or response map 235. In the embodiment shown, the class hierarchy viewer 210 comprises a horizontal icicle plot. The class hierarchy viewer 210 includes a plurality of rectangles 402, each representing a group of classes and/or a group of groups of class. The rectangles 402 are organized vertically according to the determined sequential ordering and organized horizontally according to the similarity hierarchy. Particularly, the rectangles 402 are arranged in a plurality of vertical columns, each column including at least one rectangle 402. As shown, the left-most column includes a one or more rectangles 402 indicating the broadest group or groups, which encompass all possible classes (e.g., a single rectangle representing the "physical entity" group, as shown). Moving from left to right, the columns include increasingly more rectangles 402 representing increasingly more narrowly defined groups of classes and/or groups of groups of class (e.g., rectangles representing the "matter" and "object" groups are in the second column from the left, as shown). The rectangles 402 have a vertical height that is proportional to the total number of classes that fall within the group. Rectangles 402 having at least a predetermined vertical height are labeled with a group name 404.

In at least one embodiment, the rectangles 402 are shaded and/or colored to encode group-level information about the corresponding group which is determined based on the received outputs of the image classification model 30 for each of the sample images from the image dataset 32. In at least one embodiment, the group-level information comprises a group-level classification performance metric. Particularly, in the case that the received outputs include a predicted class label for each of the sample images from the image dataset 32, the processor 14 is configured to calculate a group-level classification performance metric for each respective group and/or rectangle 402. An image is correctly classified with respect to a group if both its actual and predicted classes are in the group. This enables defining the following possible metrics: (1) Group-level precision, which measures how many of the samples classified in a group actually belong to the group, (2) Group-level recall, which measures how many of the samples that actually belong to a group are classified into the group, and (3) Group-level F-measure, which is based on group-level precision and recall according to the equation:

$$F_1(g) = 2 \times \frac{\text{Precision}(g) \times \text{Recall}(g)}{\text{Precision}(g) + \text{Recall}(g)}. \quad (1)$$

In one embodiment, the child rectangles 402 of a parent rectangle 402 in the hierarchy can be sorted by a user-selected criterion, such as size or performance metrics. In one embodiment, rectangles 402 that have only one child are contracted to compress the hierarchy and eliminate visual artifacts caused by otherwise salient linear branches. In one embodiment, hovering the mouse over a rectangle shows information 406 about the respective group including its group label and a group-level classification performance metric (e.g., "bird (94%)"). In one embodiment, clicking on a rectangle 402 selects the corresponding classes and updates the other graphical depictions to focus on these classes, such as the confusion matrix 230, the response map 235, and the sample viewer 250.

Confusion Matrix

Figure 6:
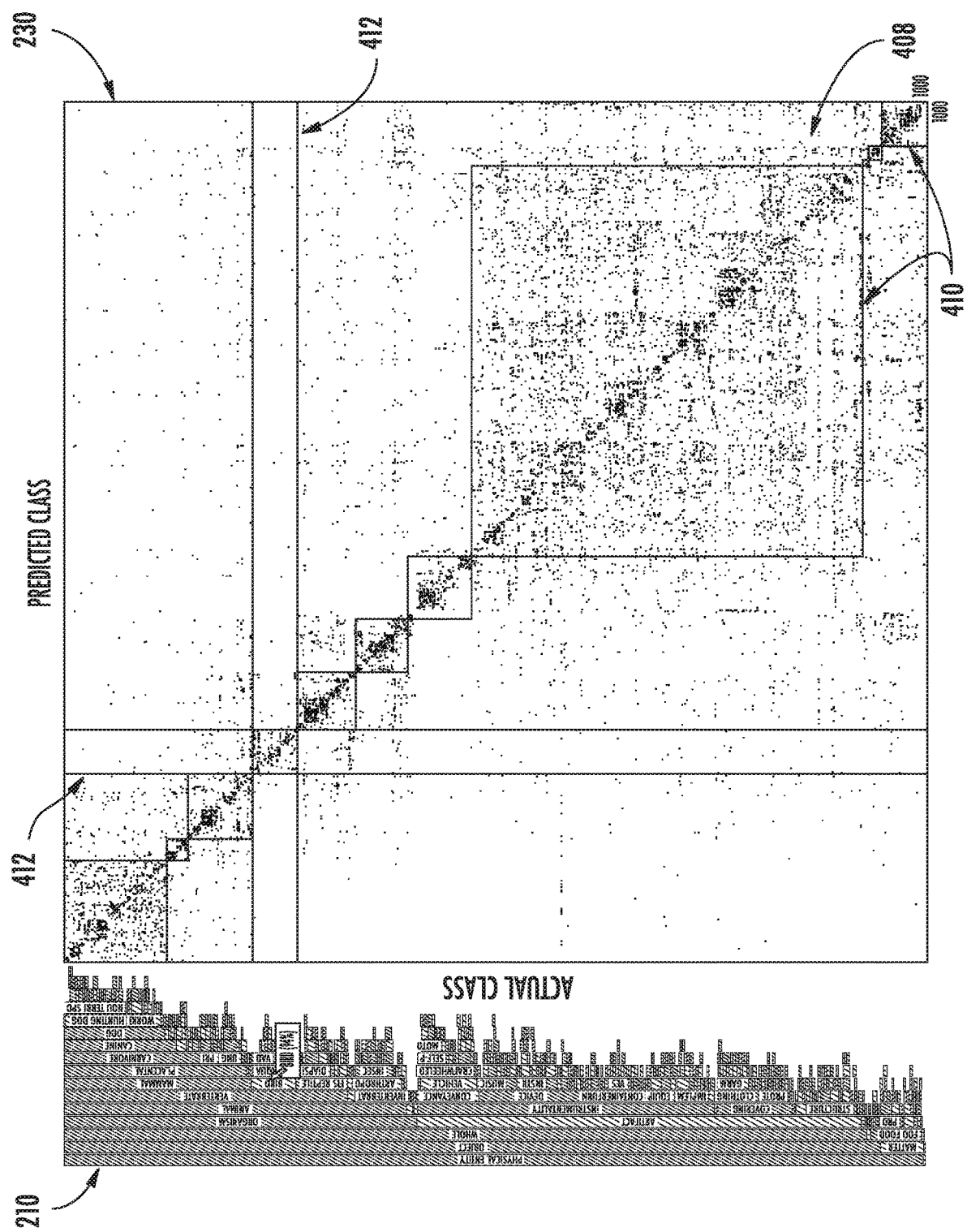
FIG. 6 shows a detailed view of the confusion matrix of the main user interface.

FIG. 6 shows a detailed view of the confusion matrix 230 of the main user interface 200. The confusion matrix 230 advantageously provides a detailed visualization of classifications and misclassification of the sample images which enables the user to easily identify frequent confusion between certain classes. The confusion matrix 230 further reveals information about error structure and classifier behavior when equipped with appropriate ordering, visual encoding, and user interactions.

The confusion matrix 230 comprises a plurality of cells arranged in a two-dimensional (2D) grid. Each cell 408 corresponds to a combination of a particular actual class label and a particular predicted class label. Each cell 408 includes a graphical element (e.g., a coloring or shading of the cell and/or a point or dot at the cell location) which encodes an output of the model with respect to the particular combination of an actual class label and a predicted class label. In at least one embodiment, the coloring or shading of the cells 408 correspond to a number images that have been classified by the image classification model 30. In the embodiment shown, the vertical dimension and/or rows of the two-dimensional grid indicates an actual class of the sample image(s) and the horizontal dimension and/or rows of the two-dimensional grid indicates a predicted class of the sample image(s). In at least one embodiment, the predicted class corresponds to the most probable class label as indicated by the output of the output layer 114 of the image classification model 30.

The actual classes on the vertical dimension correspond the predefined set of possible classes (e.g., 1000 possible classes) and are ordered along the vertical dimension according the sequential ordering, which was determined based on the similarity hierarchy, as discussed above. Similarly, the predicted classes also correspond to the predefined set of possible classes (e.g., 1000 possible classes) and are ordered along the horizontal dimension also according the determined sequential ordering. In the illustrated embodiment, the actual classes are ordered 1 through 1000 from top to bottom and the predicted classes are ordered 1 through 1000 from left to right.

Correct classifications are encoded by cells along the diagonal of the confusion matrix. Additionally, due to the sequential ordering of the classes based on the similarity hierarchy, similar classes are clustered with one another in the confusion matrix. As a result, it can be observed that a majority of cells 408 corresponding to misclassification occur near the diagonal. The ordering reveals similarity groups among the classes as clusters of cells, which are referred to herein block patterns 410. Typically, the majority of confusion takes places within a number of blocks 410 along the diagonal, each of which corresponds to a group of similar classes.

In addition to an appropriate class ordering, the visual encoding of the cells can play a major role in revealing block patterns 410 and their outliers. Particularly, in at least one embodiment, the processor 14 is configured to, for each cell on the confusion matrix 230, determine a value of each cell as a number of times the classification or misclassification occurred. The processor 14 is configured to display the cells of the confusion matrix 230 using a sequential color scale which maps a value 1 to a light shade and the largest value to a dark shade. In one embodiment, cells with value 0 remain white, which facilitates identifying and selecting non-zero cells that represent actual confusions.

In one embodiment, by default, the processor 14 is configured to exclude the matrix diagonal from the visual mapping and color those cells as white, since correct classifications usually account for the majority of the value sum in the matrix. This eliminates an, otherwise, salient diagonal which interferes with fine-grained block patterns. The per-class accuracy can be displayed more appropriately using the class hierarchy or in the sample viewer.

In the case that a pre-defined class hierarchy is available, the processor 14 is configured to display the class hierarchy in the class hierarchy viewer 210 and order the matrix accordingly. However, if such a hierarchy is unavailable or fails to reveal a block pattern 410, the hierarchy can be defined or redefined using the visual analytics program 28. Particularly, the user can explore if such pattern exists by interactively applying one or more seriation algorithms. In at least one embodiment, the processor 14 is configured to apply at least one seriation algorithm to reveal block patterns in the confusion matrix and to order the class hierarchy viewer 210 and the confusion matrix 230 accordingly. In at least one embodiment, the settings menu 260 of the main user interface 200 includes an option for selecting different seriation algorithms, such as spectral clustering, so that the user can view different orderings of the confusion matrix 230.

In some embodiments, the user can click and drag on rectangles 402 of the class hierarchy viewer 210 to reorder the confusion matrix. In one embodiment, the hierarchy can be refined recursively. Particularly, the user may select a high-level rectangle 402 of the class hierarchy viewer 210 (i.e. one corresponding to a broader group), and click an option in the settings menu 260 to apply a seriation algorithm only to the classes within the selected group. At each step, the confusion matrix 230 is updated to allow inspecting the plausibility of the computed sub-blocks and to guide algorithmic choices. If plausible, the hierarchy viewer 210 is updated to reflect the constructed hierarchical structure.

After the class hierarchy and the corresponding block patterns 410 are established, it is possible to distinguish between non-diagonal matrix cells based on their location in the matrix. Particularly, cells that are within a dense block pattern 410 represent confusions between highly-similar classes. In contrast, cells that do not belong to a block 410 represent unexpected confusions between classes that seem to be less related, and are hence especially interesting to explore further. We call these cells block outliers.

In one embodiment, the processor 14 is configured to display boxes around the block patterns 410. In one embodiment, the processor 14 is configured to automatically identify a defined number of block patterns 410 in the plot using a partitioning algorithm. In one embodiment, the settings menu 260 of the main user interface 200 includes an option for specifying a number of blocks b, which are to be identified by the partitioning algorithm. The processor 14 selects a partitioning which maximizes the cell value density of its blocks 410. The displayed boxes are retained during filtering, which helps keeping track of block memberships. In one embodiment, the processor 14 divides the confusion matrix 230 into b×b clickable regions based on the blocks 410, which eases the identification and selection of block outliers.

The visual analytics program 28 enables various interactions with the confusion matrix. These interactions are essential to identify various sources of classification errors, especially those related to data quality issues.

In one embodiment, there are two ways to select sample images via the confusion matrix 230. First, the user can use the mouse pointer to draw a box around certain cells 408. Second, in one embodiment, the user can select a rectangle 402 of the class hierarchy viewer 210 to select a particular group of classes. In response to this selection, the processor 14 is configured to display vertical and horizontal bands 412 overlaid upon the confusion matrix 230, which highlights the cells 408 of the confusion matrix 230 that correspond to selected group of classes. The bands 412 highlight false positives (FPs) and false negatives (FNs) with respect to the selected group of classes. The intersection of these bands 412 is confusions between classes that belong to the selected group and hence represent group-level true positives (TPs). In one embodiment, the cells 408 within the bands 412 may be shaded or colored differently. In some embodiments, the corresponding cells 408 are highlighted using some other method. As discussed in further detail below, the sample viewer 250 is updated to show the selected samples, and allows exploring the group-level TPs, FPs, and FNs individually.

In one embodiment, the settings menu 260 includes an option via which the user can select a logarithmic mapping of cell values to color. Particularly, even among off-diagonal cells, there is typically a large variation in values. While the majority of non-zero cells typically have small values, a very small number of cells 408 might have large values and indicate classes that are very frequently confused for each other. In response to selection of the corresponding option, the processor 14 is configured to logarithmically map cell values to color, which helps emphasize less frequent confusions that form the block patterns.

In one embodiment, the settings menu 260 includes an option via which the user can select to emphasize non-zero cells by enabling a halo effect. Even though standard displays offer sufficient space to map a 1000×1000 matrix to pixels without overlaps, assigning one pixel to a cell makes it barely visible, which might leave block outliers unnoticed. In response to selection of the corresponding option, the processor 14 is configured to emphasize non-zero cells by enabling a halo effect, which extends 1-pixel cells into 3×3 pixels and assigns 30% opacity to a peripheral halo area around the 3×3 colored pixels. This effect not only emphasizes block outliers, it further improves the perception of blocks and sub-blocks within them. The halos are visual artifacts that might add shade to, otherwise, empty cells.

In one embodiment, the settings menu 260 includes an option via which the user can filter misclassified sample images encoded in the matrix cells according to multiple criteria. The matrix is updated to show confusion patterns among the filtered samples.

In one embodiment, the settings menu 260 includes an option via which the user can filter and/or hide cells of the confusion matrix 230 which have values less than a particular threshold selected by the user. This retains cells representing repetitive confusions and hides cells representing infrequent confusion. These cells often indicate overlapping class semantics.

In one embodiment the settings menu 260 includes an option via which the user can filter and/or hide cells of the confusion matrix 230 whose actual classes are among the top-k predicted classes computed by the image classification model 30. The remaining samples represent the classifier's top-k error, a commonly-used error measure that aims to account for cases where a sample actually fits in multiple classes.

In one embodiment, the settings menu 260 includes an option via which the user can filter and/or hide cells of the confusion matrix 230 having a classification probability outside of a selected range according to the output of the output layer 114 of the image classification model 30. This retains samples for which the classifier predictions were computed with probability in a certain range. For example, the user can filter to only see cells corresponding to predictions with relatively low certainty (e.g., the most probable class has less than 50% probability). Similarly, in one embodiment, the settings menu 260 includes an option via which the user can filter and/or hide cells of the confusion matrix 230 in which the predicted probability of the actual class is within a selected range. For example, the user can filter to only see cells corresponding to predictions with low probability for the actual class. It will be appreciated that such filtering enables the user to focus on particular types of classification errors, thereby enhancing the ability to diagnose problems with the model 30 or training data.

Response Map

FIG. 7 shows a detailed view of a response map 235 which is displayed in the main window 220 of the main user interface 200 in response to a selection thereof by the user via the option 240. The response map 235 provides overview of the neuron responses at a selected neural network layer of the image classification model 30 to all sample images in the dataset. The response map 235 advantageously enables a user to identify whether classes in the same group activate a similar set of feature detectors and/or neurons of the convolutional layers of the model, and which combination of features characterize a class or a group of classes. This enables understanding how well different convolutional layers in the image classification model 30 can discriminate between groups in different levels of the class hierarchy and how sensitive to data variation the developed feature detectors are. The response map 235 reveals variations in these responses across groups, classes, and neurons, rather than across samples. The response map 235 further enables a compact visual encoding of responses computed from a large number of samples.

Much like the confusion matrix 230, the response map 235 comprises a plurality of cells arranged in a two-dimensional (2D) grid. Each cell 414 corresponds to a combination of a particular actual class label and a particular neuron of a selected neural network layer of the model 30. Each cell 414 includes a graphical element (e.g., a coloring or shading of the cell) which encodes an output of the model with respect to the particular combination of an actual class label and a particular neuron in the selected layer. In the embodiment shown, the graphical element of each cell 414 encodes an average response of the corresponding neuron the sample images in the corresponding actual class. The vertical dimension and/or rows of the response map 235 correspond to the predefined set of possible class labels (e.g., 1000 possible classes) and are ordered along the vertical dimension according the sequential ordering, which was determined based on the similarity hierarchy, as discussed above. The horizontal dimension and/or columns of the response map 235 correspond to the neurons of the selected neural network layer of the image classification model 30, and their order is updated according to a user selection.

Figure 8:
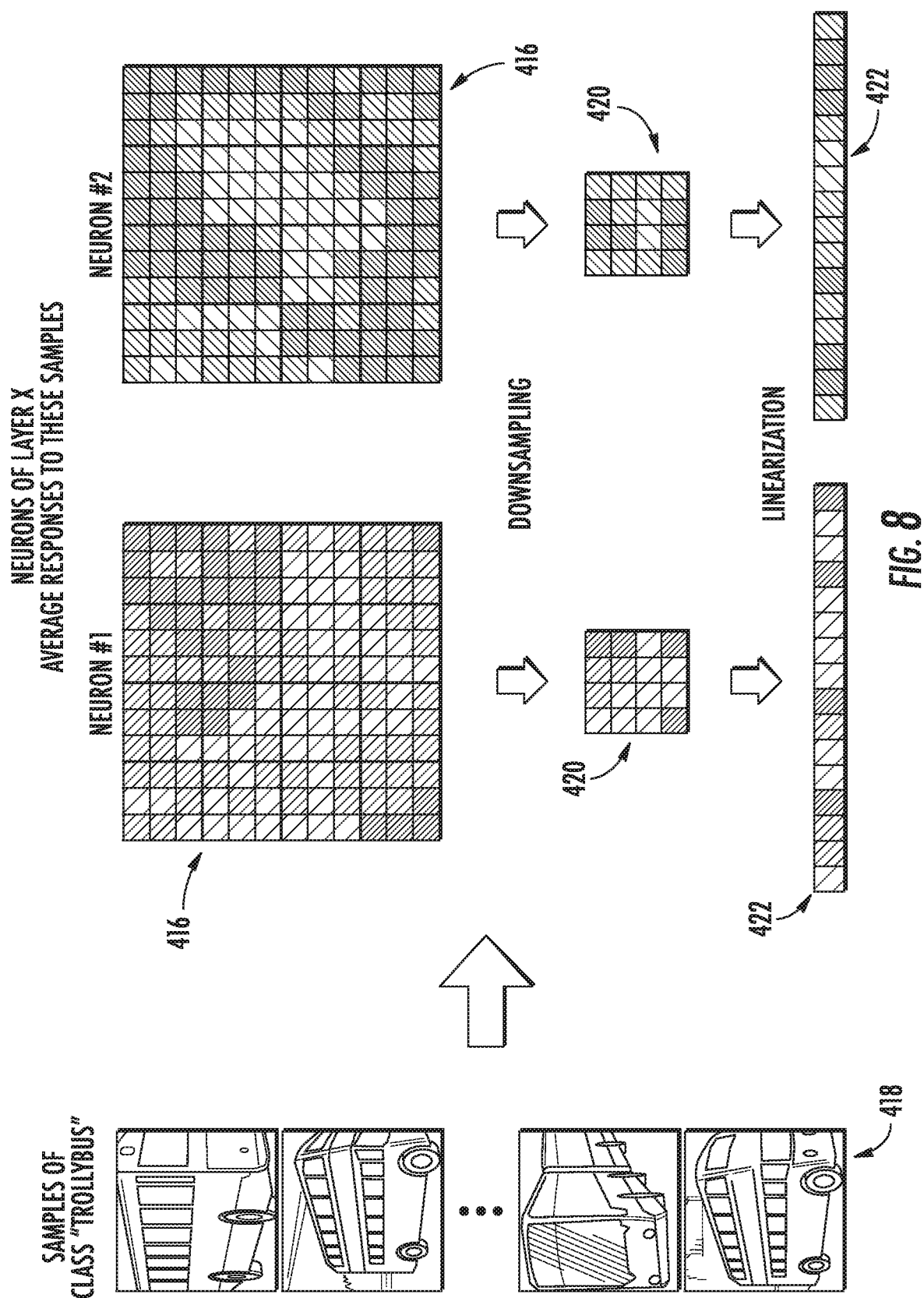
FIG. 8 shows formation of a linearized response profile of neurons in a selected neural network layer of the image classification model.

A neuron often has multiple output channels and/or values as in the case of filters in convolutional layers and the associated pooling units and rectified linear units (ReLUs). In at least one embodiment, the graphical element of each cell 414 comprises a linearized 1-pixel-tall heatmap representing the neuron's average response profile to images in the corresponding class. FIG. 8 illustrates a how the linearized 1-pixel-tall heatmaps are generated based on the neuron responses. Particularly, the processor 14 is configured to determine an average response 416 (a 12×12 matrix, as shown) of the neuron to sample images 418 in the class (e.g., "trollybus"). In some layers, the convolutional filters can be as large as 64×64, especially in early layers of the image classification model 30. To gain overview of multiple filters of this size in one view, in one embodiment, the processor 14 is configured to downsample the average response 416 to generate a downsampled response 420 (e.g., a 4×4 matrix, as shown). Next, the processor 14 linearizes the response to generate a linearized 1-pixel-tall heatmap 422. This allows comparing multiple response profiles side by side. Furthermore, this consolidates major variations between these profiles, since these variations would be otherwise scattered across numerous channels. As a result, the 2-dimensional structure of the neuron's output is lost, in favor of emphasizing how its responses vary across multiple classes, which we denote as the response profile of the neuron.

The color of each pixel or cell in neuron response 416, 420 and in the linearized heatmap 422 represents a value of the average response of a neuron's channel among sample images of the particular class. In one embodiment, the settings menu 260 includes an option via which the user can specify a threshold T for this response. In one embodiment, values smaller than T are mapped linearly to a color scale from black to light blue or any first color. In one embodiment, values equal to or larger than T are shown in yellow or any second color that is different from the first color. This emphasizes cells and/or pixels representing high responses. Adjusting the threshold T enables identifying neurons that respond specifically to certain classes and exploring subtle differences between different response profiles.

Returning to FIG. 7, the usage of the unified class ordering in the response map 325 and the class hierarchy view 210 enables analyzing the relation between the response profile of the neurons and the class hierarchy. Certain response profiles show high responses mainly for samples within a particular group of classes in the class hierarchy. This means that the corresponding neurons learned shared features among the sample images of these classes such as shape, pose, or background.

In one embodiment, to select a particular group of classes, the user can select a rectangle 402 of the class hierarchy viewer 210, click and/or drag on the response map 235, or perform some other interaction. In response to this selection, the processor 14 is configured to sort the horizontal dimension and/or columns of the response map 235 by how responsive the respective neurons are to the sample images in the selected group. For this purpose, the processor 14 is configured to compute a relevance measure RG(N) for each neuron N which indicates the neuron's responsiveness to the selected group of classes, based on its responses to group samples G and to non-group samples $\overline{G}$:

$$R_G(N) = \frac{Q_{1/4}(\{f_N(x) : x \in G\})}{Q_{3/4}(\{f_N(x) : x \in \overline{G}\})}, \quad (2)$$

where $f_N(x)$ is the collective response of the neuron to a sample x, computed as the sum of all of its output channels, and $Q_{i/q}$ is the $i^{th}$ q-Quantile. This relevance measure indicates a statistical significance of the neuron's response profile and takes a high value when the response is consistently high among the group classes and consistently low among non-group classes. The processor 14 is configured to sort the columns based on the computed relevance measure for each neuron. In the embodiment shown, the neurons are sorted from left to right from the largest relevance measure value to the smallest relevance measure value.

In one embodiment, each column of the response map 235 has a column header 424. In the embodiment shown, the column headers 424 are shown as a rectangle with a neuron ID, but can take other forms. In one embodiment, a color and/or shading of the header 424 can communicate the computed relevance measure. Particularly, the processor 14 is configured to color and/or shade each respective header 424 depending on the computed relevance measure for the respective neuron.

Visual inspection enables identifying if a neuron responds to a sub-group or super-group of the selected group, or possibly to other groups as well. Particularly, group-level features are often based on shape, pose, and background. For example, within natural objects, a combination of shape and pose features can distinguish high-level groups such as birds, mammals, and insects. Background features are involved in certain groups such as fishes and geological formations.

On the other hand, color features as well as certain texture features are often shared across various classes that do not fall in a specific group. To facilitate analyzing such cases, a user can select a particular neuron by clicking on a cell of the response map 235 or on a corresponding header 424. In one embodiment, a color and/or shading of the rectangles 412 of the class hierarchy viewer 410 can also communicate the computed relevance measure. Particularly, the processor 14 is configured to color and/or shade each respective rectangle 412 depending on an average response for the selected neuron.

For some groups of class, such as devices, it is possible that no neuron exhibits significant difference in responses between group classes and non-group classes. Such lack of group-level features indicates a high variation among the group classes, and the neurons typically develop class-specific features instead.

Besides the response profiles, the response map 235 provides additional information about a neuron either in summary or in detail forms. As discussed above, the header 424 of the response map 235 can communicate summary information about the neurons by means of color. In some embodiments, processor 14 is configured to color and/or shade each respective header 424 depending on an average activation within the samples of a selected class, relevance measure of a selected group, or sensitivity to an image transformation.

In one embodiment, clicking on a profile header 424 updates the sample viewer 250 to show samples that highly activate the corresponding neuron. This helps users find common image features across these samples in order to identify the image features to which the neuron responds. The sample viewer 250 provides several possibilities to explore the samples along with saliency maps of their image features. Understanding the image features that a neuron responds to is important to understand how each class is being detected by the convolution layers of the image classification model 30 and why certain sample images from the class are misclassified. Typically, the network characterizes each class by a set of features that are detected by different neurons.

Auxiliary Response Map View

In at least one embodiment, neuron responses to individual samples of a particular class can be explored on demand in an auxiliary view. In one embodiment, the auxiliary view is shown in response to the user clicking one of the cells 414 of the response map 235 or via some other interaction.

Figure 9:
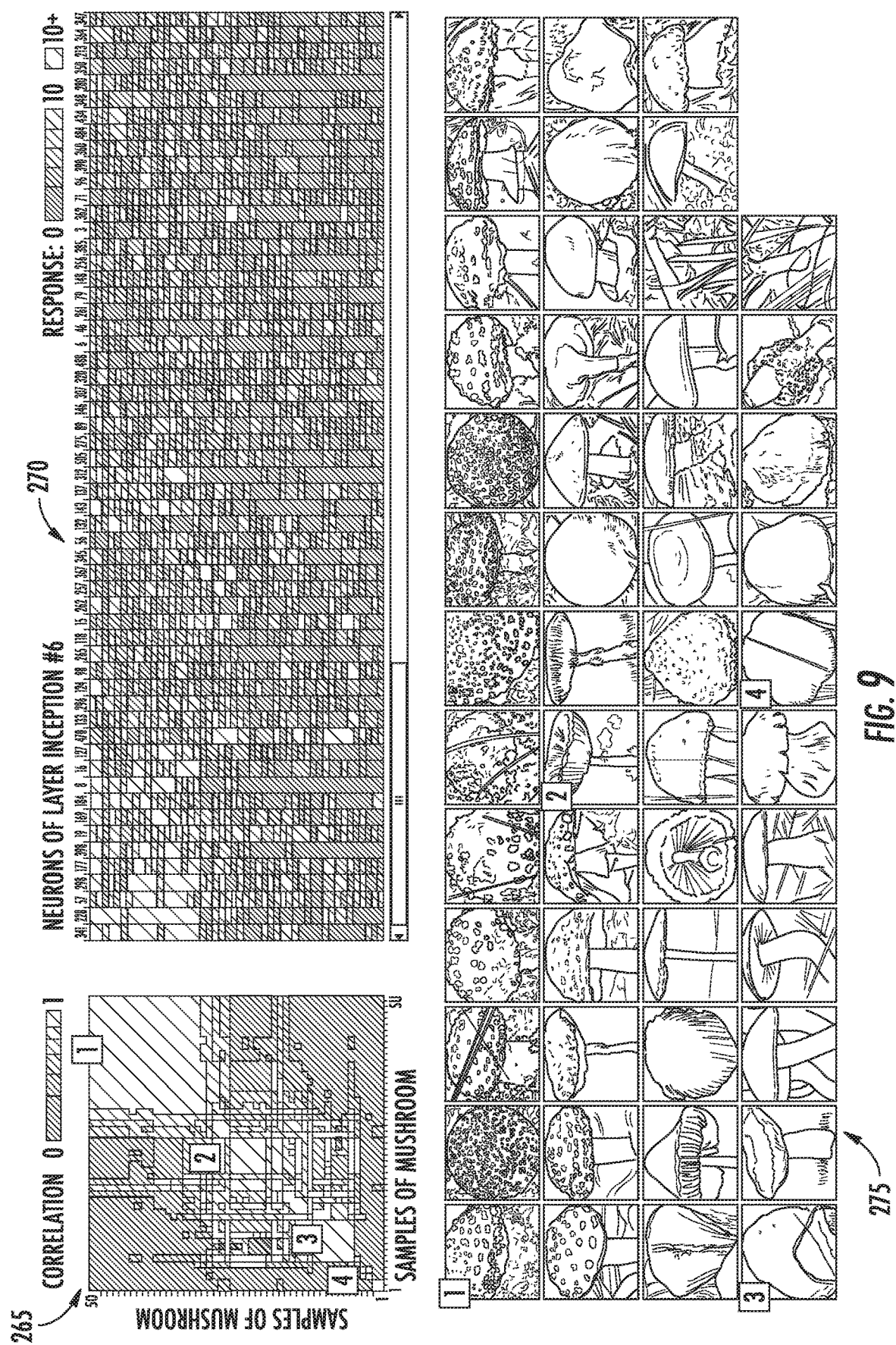
FIG. 9 shows an auxiliary view having class-level correlation matrix, response map, and sample viewer.

FIG. 9 shows an auxiliary view 260 having class-level correlation matrix 265, response map 270, and sample viewer 275. In contrast with the response map 235, which aggregates neuron responses per class to show variation across different classes, the auxiliary view 260 enables exploration of possible latent subclasses within the samples of a selected class. In many cases, the responses vary within the same class due to latent subclasses, e.g. cut vs. full apples.

Much like the confusion matrix 230, the response map 235 comprises a plurality of cells arranged in a two-dimensional (2D) grid. Each cell 414 corresponds to a combination of a particular actual class label and a particular neuron of a selected neural network layer of the model 30. Each cell 414 includes a graphical element (e.g., a coloring or shading of the cell) which encodes an output of the model with respect to the particular combination of an actual class label and a particular neuron in the selected layer. In the embodiment shown, the graphical element of each cell 414 encodes an average response of the corresponding neuron the sample images in the corresponding actual class.

Much like the confusion matrix 230, the correlation matrix 265 comprises a plurality of cells arranged in a two-dimensional (2D) grid. Each cell corresponds to a combination of a first sample image from a selected class and a second sample image from the selected class. Each cell includes a graphical element (e.g., a coloring or shading of the cell) which encodes a correlation between the neuron responses for the respective combination of first and second sample images, indicating a similarity of the images. Both the horizontal and vertical dimensions of the correlation matrix 265 correspond to the sample images of the selected class. In one embodiment, the correlation matrix 265 is sorted using spectral clustering, such that correlated samples are clustered together.

The response map 270 is similar to the response map 235, and has a plurality of cells arranged in a grid. The vertical dimension and/or rows of the response map 270 correspond to each individual sample in the selected class. The horizontal dimension and/or columns of the response map 270 correspond to each individual neuron of the selected layer of the image classification model 30. The rows are arranged in the same order as in the correlation matrix 265, such that correlated samples are clustered together. Each cell is colored according to a response of the particular neuron to the particular sample image in the selected class.

The presence of multiple blocks patterns 1-4 in the correlation matrix 265 indicates the presence of latent subclasses in the selected class. As shown, the correlation matrix 265 includes four distinct block patterns 1-4, indicate four latten subclasses of the sample images for mushrooms. The sample viewer 275 shows thumbnails of each sample in the selected class, which are sorted in the same order as the correlation matrix. Selecting a block pattern in the correlation matrix 265 highlights the corresponding samples in the sample viewer 275 and reorders the neurons in the response map 270 according to their responses within these samples.

By inspecting the correlation matrix 265 at successive layers of the image classification model 30, the use can observe how the latent subclasses emerge in the image classification model 30. Despite activating different feature detectors in the image classification model 30, these subclasses can still activate the same output unit. This is thanks to the final layers in the image classification model 30 being fully connected, which enables the output unit of a class to combine responses from multiple features. Identifying latent subclasses and analyzing their properties gives opportunities to optimize the classification process of the model 30.

Sample Viewer

Figure 10:
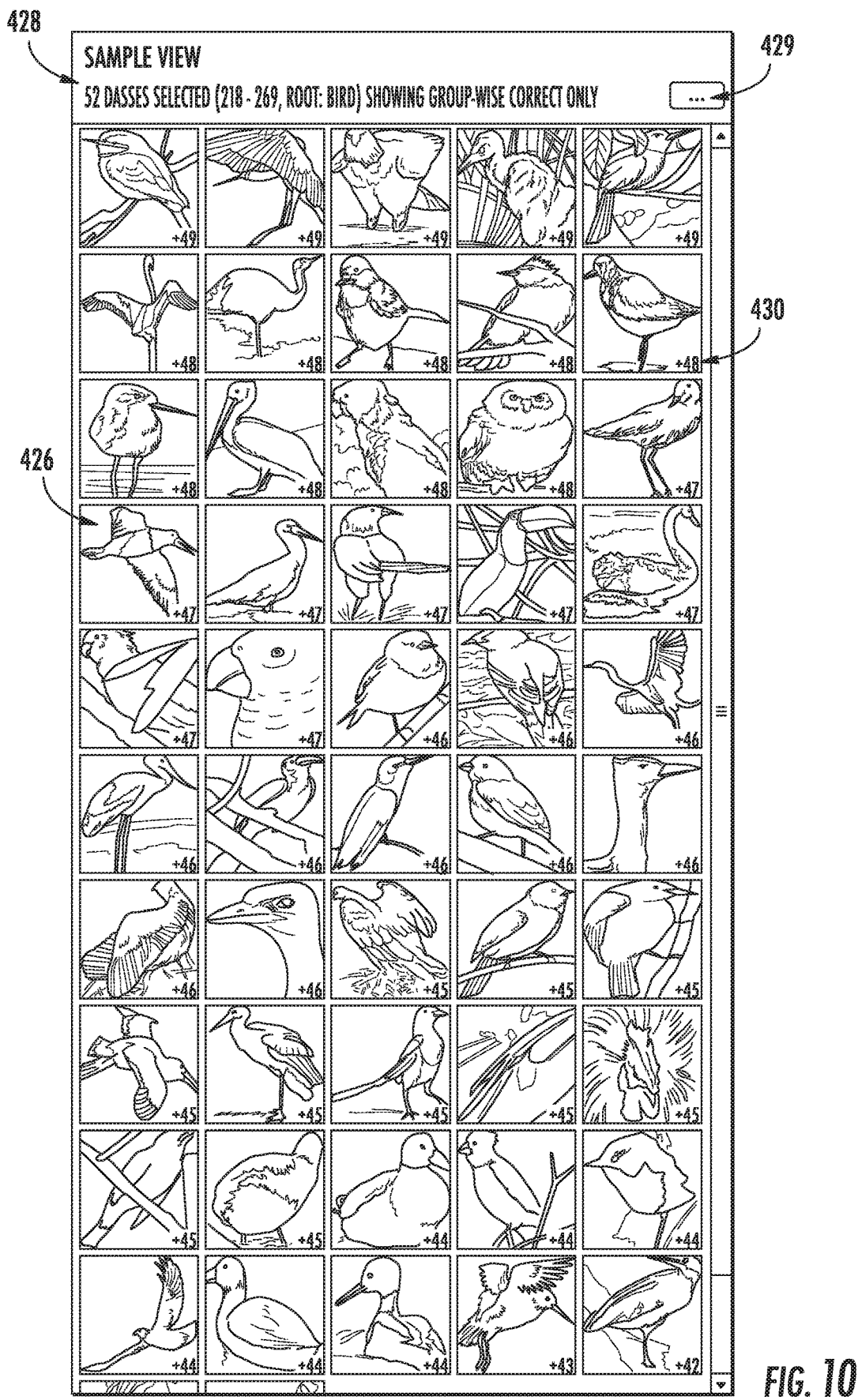
FIG. 10 shows a detailed view of the sample viewer of the main user interface.

FIG. 10 shows a detailed view of the sample viewer 250 of the main user interface 200. The sample viewer 250 enables the user to inspect classification errors. The sample viewer 250 shows thumbnail images 426 of selected samples and offers various possibilities to manipulate and explore them. A label 428 at the top of the sample viewer 250 describes what the current selection represents (e.g., "52 classes selected (218-269, root: bird) showing group-wise correct only"). The samples can be grouped by their actual classes or by their respective groups in the similarity hierarchy. A representative sample of each group is shown as thumbnail image 426 along with a number 430 indicating the count of the remaining samples. This gives an overview of all classes included in the selection and helps in inferring common features among them.

As mentioned above, the user can interact with the class hierarchy viewer 210, the confusion matrix 230, and the response map 235 in various ways to selected particular groups of classes or particular classes of the sample images. The sample viewer 250 shows the sample images that have been selected.

When showing individual samples, the user can obtain details about them either on top of the thumbnails or in tooltips. For example, in one embodiment, a border color indicates whether the predicted class label for a sample is top-1 correct, top-5 correct, or otherwise.

Figure 11:
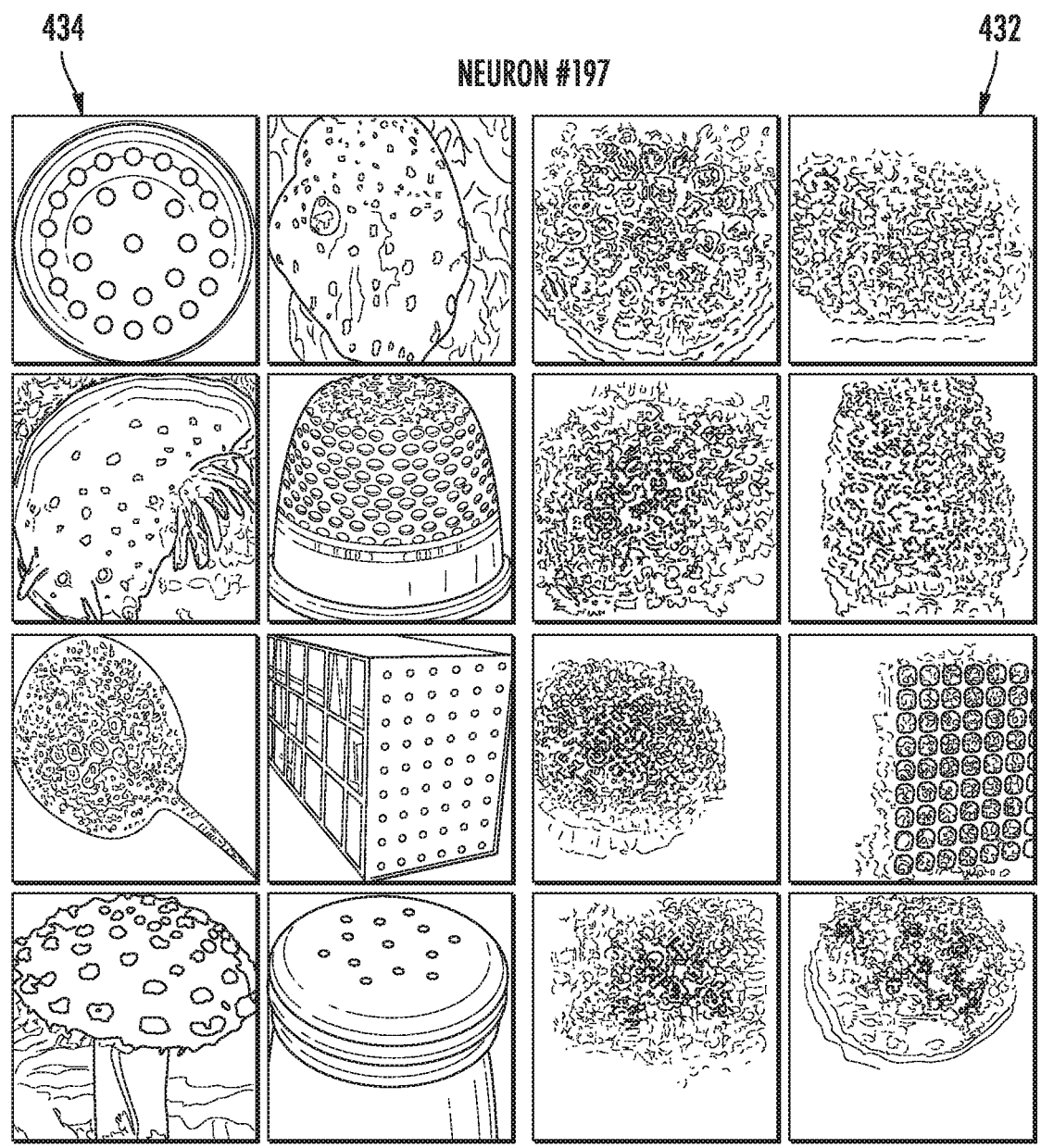
FIG. 11 shows exemplary saliency maps for an exemplary neuron which responds to sample images of objects having spots.

In one embodiment, if a user selects a particular neuron via the response map, the sample viewer 250 shows saliency maps of the sample images, which highlight image features and/or portions of the image that the selected neuron responds to, in order to analyze the role of the selected neuron in the image classification model 30. FIG. 11 shows exemplary saliency maps 432 for an exemplary neuron which responds to sample images 434 of objects having spots.

In some embodiments, the user can select various options from the settings menu 260, or a separate menu shown in response to clicking an option 429, to sort and/or filter the thumbnails 426 show in the sample view 250. The samples in the viewer 250 can be filtered by various criteria such as membership of a selected class group, activation of a selected neuron, and class-level or group-level classification results. In one embodiment, the user can sort the thumbnails 426 based on classification performance into true-positives, false-positives, and false-negatives.

Additionally, the visual analytics program 28 allows loading multiple sets of classification results computed by different classifiers or after applying different data transformations (such as rotating the sample images). For example, the user may load and compare classification outputs for greyscale versions of the samples to investigate the effects of color on the model performance. Similarly, the user may load and compare classification outputs for rotated versions of the samples to investigate the effects of rotating the images on the model performance. Users can filter the samples based on these results, e.g. to show samples correctly classified under all rotations or ones correctly classified by a selected classifier only. This enables identifying samples and classes that have certain properties such as rotation invariance and ease of discrimination, or ones that only a selected classifier excels in.

The visual analytics program 28 improves upon conventional analytics methods for CNN classifiers because it enables the user to better understand the training process, diagnose the separation power of the different feature detectors, and improve the architecture of the image classification model 30 accordingly to yield significant gain in accuracy.

The visual analytics program 28 is useful for understanding and adapting the training process. Using the visual analytics program 28, a user can view the performance of the image classification model 30 after each training epoch using an option in the settings menu 260. In this way, the user can view changes in performance over each epoch to better understand the convergence of the model 30. Understanding the training behavior of CNNs helps in introducing targeted design improvements to large-class CNN classifiers. Inspecting group-level performance under different conditions reveals the impact of the hierarchical structure on CNN performance and its sensitivity to data variation. The visual analytics program 28 allows analyzing at which convolutional layer of the model 30, the feature detectors are able to separate certain groups of classes.

Figure 12:
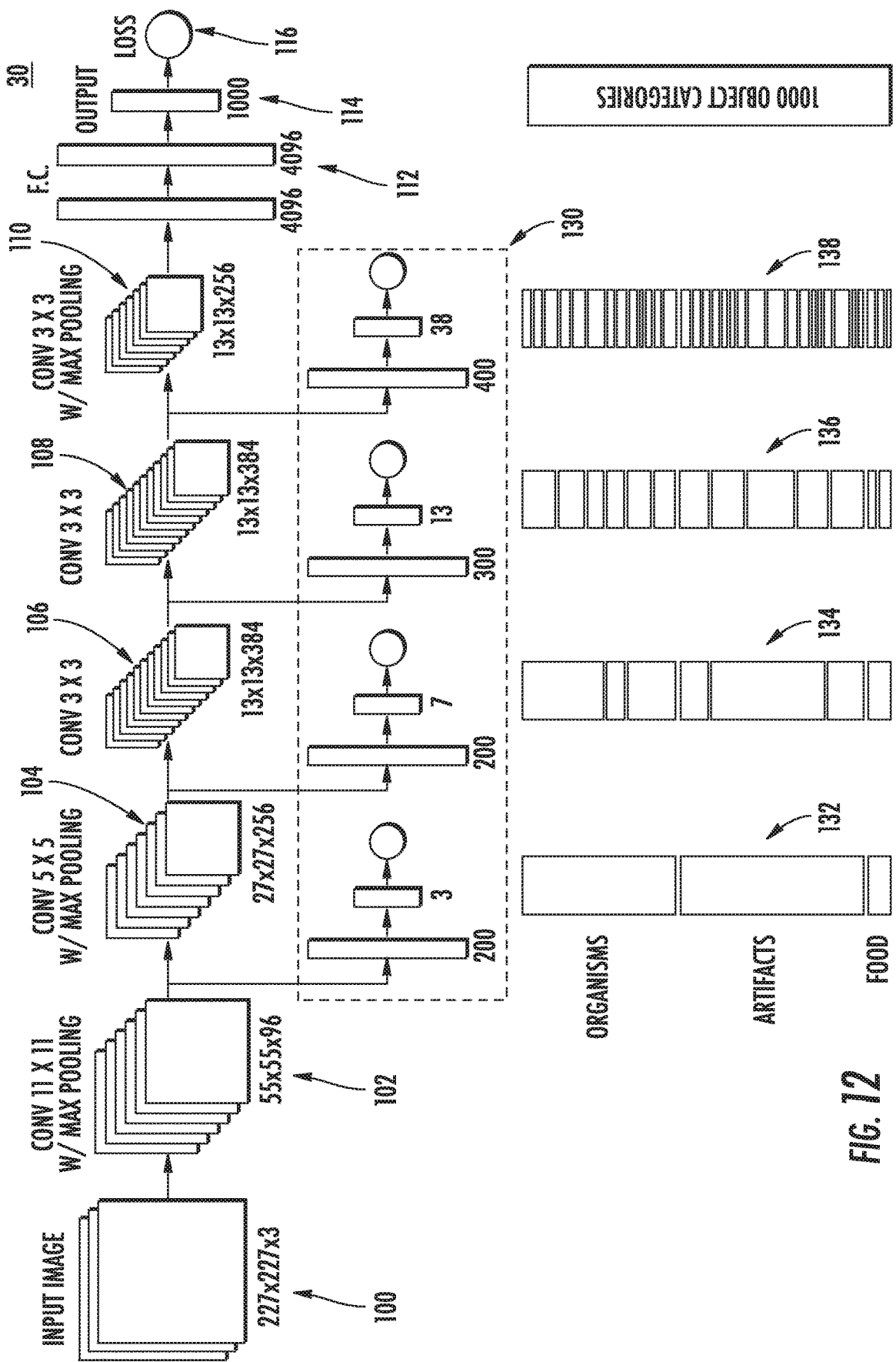
FIG. 12 shows an exemplary improvement to the image classification model of FIG. 2.

This information can be used to adapt a training process of the CNNs to be hierarchy-aware, thereby significantly improving the accuracy and accelerating the training convergence. FIG. 12 shows an exemplary improvement to the architecture of the image classification model 30. Particularly, the image classification model 30 is modified to include additional classification targets 130 during training. The additional classification targets 130 are included only during the training process as separate branches after the first convolutional layer 102, after the second convolutional layer 104, after the third convolutional layer 106, and after the fourth convolutional layer 108. Each additional classification target 130 includes a respective fully connected layer, output layer and loss function, which are similar to the fully connected layers 112, the output layer 114, and the loss function 116. The additional branches back-propagate the error on the group level to the main branch. The main branch calculates a weighted sum of the error back-propagating from different branches and updates the convolutional filters accordingly.

In the illustrated example, the additional classification target 130 after the first convolutional layer 102 is configured to train the layer to classify images into one of three broad high-level groups 132 (e.g., organism, artifacts, and food). Similarly, the additional classification target 130 after the second convolutional layer 104 is configured to train the layer to classify images into one of seven high-level sub-groups 134. The additional classification target 130 after the third convolutional layer 106 is configured to train the layer to classify images into one of thirteen narrow sub-groups 136. Finally, the additional classification target 130 after the fourth convolutional layer 108 is configured to train the layer to classify images into one of thirty eight narrower sub-groups 138.

The usage of these additional classification targets 130 improves training speed and accuracy of the model 30 by leveraging the class hierarchy and the observed separability of different groups, as investigated and illuminated using the visual analytics program 28. The particular groups used as classification targets at each specific layer can be determined based on the group separation that is achieved at that layer. Particularly, a group of classes (e.g. "mammals") is selected as a high-level classification target if the layer's responses to the plurality of images from this group are similar, and at the same time, different from its responses to images from other classes. In other words, the groups chosen for each additional classification target 130 are the most highly separable groups at the respective convolutional layer in the model.

The visual analytics program 28 is also useful for identifying problems in the training data and/or class definitions. The visual analytics program 28 helps in improving the curation of training datasets by understanding sensitivity properties of the CNN classifier and diagnosing various quality issues in the training data. Particularly, visual analytics program 28 aids in identifying redundancy between two classes are identical but belong to branches of a hierarchy, such as missile and projectile, bassinet and cradle, or sunglass and sunglasses, dark glasses. Additionally, the visual analytics program 28 aids in identifying subclass relationships in which one class is a special type of the other class, such as bolete and mushroom, or coffee mug and cup. The visual analytics program 28 aids in identifying part-of relationships in which one class represents part of another class, such as wing and airplane, or monitor and desktop computer. Furthermore, the visual analytics program 28 aids in identifying semantic ambiguity between two classes that have similar semantics such as bookstore and library, or gas mask and oxygen mask. The visual analytics program 28 aids in identifying abstract classes in which one class, such as groom, takes multiple forms that are often confused with physical classes, such as suit. Additionally, the visual analytics program 28 also helps in detecting mislabeled samples, such as an image of a lion labeled as monkey, by inspecting misclassified samples having very high prediction probability and very low probability assigned to the ground truth. Isolating such cases is useful to robustly compare different architectures. Finally, the visual analytics program 28 helps in restructuring the pre-defined class hierarchy to better reflect their visual similarity structures.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for visualizing an operation of an image classification model having a plurality of neural network layers including at least one convolutional layer, the method comprising:

receiving, with a processor, a plurality of actual class labels, each actual class label being associated with a respective sample image in a plurality of sample images, each actual class label corresponding to one of a predefined plurality of classes;

receiving, with the processor, a plurality of outputs of the image classification model, each output being provided by the image classification model responsive to a respective sample image in the plurality of sample images;

determining, with the processor, a sequential ordering of the predefined plurality of classes based on a similarity hierarchy of the classes in the predefined plurality of classes, the similarity hierarchy defining a plurality of groups of similar classes in the predefined plurality of classes; and displaying, with a display device, a graphical depiction of the plurality of outputs, the graphical depiction including a plurality of cells arranged in a two-dimensional grid, a first dimension of the grid corresponding to the plurality of actual class labels and being ordered according to the determined sequential ordering of the predefined plurality of classes, each cell having a respective graphical element encoding at least one output in the plurality of outputs that was provided by the image classification model responsive to sample images having the actual class label corresponding to the respective cell.

2. The method according to claim 1, the determining the sequential ordering further comprising:

determining the sequential ordering such that class labels in the predefined plurality of class labels that are in a same group as defined by the similarity hierarchy are grouped together in the sequential ordering.

3. The method according to claim 1, wherein:

the plurality of outputs include a plurality of predicted class labels assigned by the image classification model responsive to the plurality of sample images, each predicted class label corresponding to one of the predefined plurality of classes;

a second dimension of the grid corresponds to the plurality of predicted class labels and is ordered according to the determined sequential ordering of the predefined plurality of classes; and the graphical element of each cell in the plurality of cells encodes a respective first number of sample images from the plurality of sample images that (i) are associated with the actual class label corresponding to the respective cell and (ii) were assigned the predicted class label corresponding to the respective cell.

4. The method according to claim 3, the displaying of the plurality of cells arranged in the two-dimensional grid further comprising:

displaying the graphical element of a respective cell in the plurality of cells with a first color in response to the respective first number for the respective cell being equal to zero; and displaying the graphical element of a respective cell in the plurality of cells with a second color that is different from the first color in response to the respective first number for the respective cell being greater than zero, a shade of the second color depending on the respective first number.

5. The method according to claim 1 further comprising:

hiding, with the display device, in response to a user selection of a filter option, a subset of the graphical elements of the plurality of cells depending on at least one filtering criterion corresponding to the selected filter option.

6. The method according to claim 1 further comprising:
displaying, with the display device, in response to a user selecting a group of cells in the plurality of cells, thumbnails of sample images in the plurality of sample images associated with an actual class label corresponding to one of the cells in the selected group of cells.

7. The method according to claim 1, wherein:
the plurality of outputs include a plurality of responses of individual neurons of a selected neural network layer of the image classification model to the plurality of sample images;
a second dimension of the grid corresponds to the individual neurons of the selected neural network layer; and
the graphical element of each cell in the plurality of cells encodes an average of the responses of the neuron corresponding to the respective cell to sample images from the plurality of sample images that are associated with the actual class label corresponding to the respective cell.

8. The method according to claim 7, wherein the graphical element of each cell in the plurality of cells is a heatmap having a plurality of pixels arranged in a grid, each pixel in the plurality of pixels have a color the depends on the average of the responses of the neuron corresponding to the respective cell to sample images from the plurality of sample images that are associated with the actual class label corresponding to the respective cell.

9. The method according to claim 8 further comprising:
downsampling and linearizing the plurality of pixels of the heatmap of each cell in the plurality of cells.

10. The method according to claim 7 further comprising:
reordering, in response to a user selecting a first group in the plurality of groups defined by the similarity hierarchy, the plurality of cells with respect to the second dimension according to a responsiveness of each neuron of the selected neural network layer to sample images from the plurality of sample images that are associated with actual class labels in the selected first group.

11. The method according to claim 1 further comprising:
displaying, with the display device, a first plurality of graphical elements, each graphical element in the first plurality of graphical elements corresponding to a respective group in the plurality of groups of similar classes defined by the similarity hierarchy.

12. The method according to claim 11, wherein the first plurality of graphical elements are arranged adjacent to the grid and are ordered with respect to the first dimension of the grid according to the determined sequential ordering of the predefined plurality of classes.

13. The method according to claim 11, wherein first plurality of graphical elements comprise a plurality of rectangles arranged in a plurality of columns, the plurality of rectangles being distributed within the plurality of columns based on the similarity hierarchy.

14. The method according to claim 11 further comprising:
highlighting, in the grid, in response to a user selecting a graphical element of the first plurality of graphical elements, cells in the plurality of cells corresponding to an actual class label that is part of the respective group corresponding to the selected graphical element.

15. The method according to claim 11 further comprising:
displaying, with the display device, in response to a user selecting a graphical element of the first plurality of graphical elements, thumbnails of sample images in the plurality of sample images associated with an actual class label that is part of the respective group corresponding to the selected graphical element.

16. The method according to claim 1 further comprising:
displaying, with the display device, in response to a user selecting a first actual class label of the plurality of actual class labels, a further graphical depiction having a plurality of cells arranged in a two-dimensional grid, a first dimension of the grid corresponding to sample images in the plurality of sample images associated with the selected first actual class label, each cell having a respective graphical element encoding at least one output in the plurality of outputs that was provided by the image classification model responsive to the sample images in the plurality of sample images associated with the selected first actual class label.

17. The method according to claim 16, wherein:
the plurality of outputs include a plurality of responses of individual neurons of a selected neural network layer of the image classification model to the plurality of sample images;
a second dimension of the grid of the further graphical depiction corresponds to sample images in the plurality of sample images associated with the selected first actual class label; and
the graphical element of each cell in the plurality of cells of the further graphical depiction encodes a correlation between the responses of the neurons of the selected neural network layer to the sample images from the plurality of sample images corresponding to the respective cell.

18. The method according to claim 16, wherein:
the plurality of outputs include a plurality of responses of individual neurons of a selected neural network layer of the image classification model to the plurality of sample images;
a second dimension of the grid of the further graphical depiction corresponds to the individual neurons of the selected neural network layer; and
the graphical element of each cell in the plurality of cells of the further graphical depiction encodes the response of the neuron corresponding to the respective cell to the sample image from the plurality of sample images corresponding to the respective cell.

19. A visual analytics system for visualizing an operation of an image classification model having a plurality of neural network layers including at least one convolutional layer, the system comprising:
a display device;
a memory configured to store a plurality of sample images and a plurality of actual class labels, each actual class label being associated with a respective sample image in the plurality of sample images, each actual class label corresponding to one of a predefined plurality of classes; and
a processor operatively connected to the display device and the memory, the processor configured to:
receive the plurality of actual class labels from the memory;
receive a plurality of outputs of the image classification model, each output being provided by the image classification model responsive to a respective sample image in the plurality of sample images;

determine a sequential ordering of the predefined plurality of classes based on a similarity hierarchy of the classes in the predefined plurality of classes, the similarity hierarchy defining a plurality of groups of similar classes in the predefined plurality of classes; and operate the display device to display a graphical depiction of the plurality of outputs, a plurality of cells arranged in a two-dimensional grid, a first dimension of the grid corresponding to the plurality of actual class labels and being ordered according to the determined sequential ordering of the predefined plurality of classes, each cell having a respective graphical element encoding at least one output in the plurality of outputs that was provided by the image classification model responsive to sample images having the actual class label corresponding to the respective cell.

20. A method for visualizing an operation of an image classification model having a plurality of neural network layers including at least one convolutional layer, the method comprising:

receiving, with a processor, a plurality of actual class labels, each actual class label being associated with a respective sample image in a plurality of sample images, each actual class label corresponding to one of a predefined plurality of classes;

receiving, with the processor, a plurality of outputs of the image classification model, each output being provided by the image classification model responsive to a respective sample image in the plurality of sample images;

determining, with the processor, a sequential ordering of the predefined plurality of classes based on a similarity hierarchy of the classes in the predefined plurality of classes, the similarity hierarchy defining a plurality of groups of similar classes in the predefined plurality of classes;

displaying, with a display device, a graphical depiction of the plurality of outputs, the graphical depiction including graphical elements encoding the plurality of outputs which are visually arranged according to the determined sequential ordering of the predefined plurality of classes; and displaying, with the display device, in response to a user selecting a first actual class label of the plurality of actual class labels, a further graphical depiction having a plurality of cells arranged in a two-dimensional grid, a first dimension of the grid corresponding to sample images in the plurality of sample images associated with the selected first actual class label, each cell having a respective graphical element encoding at least one output in the plurality of outputs that was provided by the image classification model responsive to the sample images in the plurality of sample images associated with the selected first actual class label.

* * * * *